US012785174B2

(12) United States Patent
Yoshida

(10) Patent No.: US 12,785,174 B2
(45) Date of Patent: Nov. 3, 2026

(54) BATTERY CASE FOR VEHICLE

(71) Applicant: Kobe Steel, Ltd., Kobe (JP)

(72) Inventor: Masatoshi Yoshida, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 537 days.

(21) Appl. No.: 18/482,921

(22) Filed: Oct. 9, 2023

(65) Prior Publication Data

US 2024/0145819 A1 May 2, 2024

(30) Foreign Application Priority Data

Nov. 2, 2022 (JP) ................................. 2022-176344

(51) Int. Cl.

| | |
|---|---|
| ***H01M 10/6568*** | (2014.01) |
| ***B60H 1/00*** | (2006.01) |
| ***B60K 1/04*** | (2019.01) |
| ***B60K 11/02*** | (2006.01) |
| ***B60L 50/64*** | (2019.01) |
| ***H01M 10/613*** | (2014.01) |
| ***H01M 10/617*** | (2014.01) |
| ***H01M 10/625*** | (2014.01) |
| ***H01M 10/6554*** | (2014.01) |
| ***H01M 10/6556*** | (2014.01) |
| ***H01M 50/242*** | (2021.01) |
| ***H01M 50/249*** | (2021.01) |

(52) U.S. Cl.

CPC .... *H01M 10/6568* (2015.04); *B60H 1/00278* (2013.01); *B60K 1/04* (2013.01); *B60L 50/64* (2019.02); *H01M 10/613* (2015.04); *H01M 10/625* (2015.04); *H01M 10/6554* (2015.04); *H01M 10/6556* (2015.04); *H01M 50/242* (2021.01); *H01M 50/249* (2021.01); *H01M 2220/20* (2013.01)

(58) Field of Classification Search

None

See application file for complete search history.

(56) References Cited

U.S. PATENT DOCUMENTS

| | | | | |
|---|---|---|---|---|
| 2017/0365888 A1* | 12/2017 | Kwon | ............... | H01M 10/4207 |
| 2020/0006730 A1* | 1/2020 | Zacher | ..................... | B60L 1/003 |
| 2021/0119282 A1* | 4/2021 | Wünsche | ................ | B60L 50/64 |
| 2021/0351455 A1* | 11/2021 | Kim | ........................ | B60L 50/66 |
| 2022/0209332 A1* | 6/2022 | Jung | ................. | H01M 10/6566 |

(Continued)

FOREIGN PATENT DOCUMENTS

JP 2021-516187 A 7/2021

*Primary Examiner* — Yoshitoshi Takeuchi

(74) *Attorney, Agent, or Firm* — Oblon, McClelland, Maier & Neustadt, L.L.P.

(57) ABSTRACT

The battery case includes a frame body having a rectangular frame shape and a support plate provided at a lower portion of the frame body and supporting the battery. Each of the pair of side frames includes a base portion constituting an inner peripheral surface of the frame body and an inner protruding portion protruding inward in the vehicle width direction from a lower end of the base portion, and the support plate is supported on the inner protruding portion. The battery case includes a refrigerant passage including an in-frame passage which is provided in the inner protruding portion, and is disposed on an inner side in the vehicle width direction with respect to the inner peripheral surface of the base portion and below the support plate.

10 Claims, 18 Drawing Sheets

(56) References Cited

U.S. PATENT DOCUMENTS

| | | | | |
|---|---|---|---|---|
| 2022/0348068 | A1* | 11/2022 | Lee | B62D 29/008 |
| 2023/0402678 | A1* | 12/2023 | Jang | H01M 10/6557 |
| 2024/0332724 | A1* | 10/2024 | Jang | H01M 50/367 |
| 2024/0413464 | A1* | 12/2024 | Kim | H01M 10/6568 |
| 2025/0030091 | A1* | 1/2025 | Jeon | H01M 10/613 |
| 2025/0030092 | A1* | 1/2025 | Moon | H01M 10/613 |
| 2025/0329845 | A1* | 10/2025 | Bloder | H01M 10/0481 |

* cited by examiner

BATTERY CASE FOR VEHICLE

CROSS REFERENCE TO RELATED APPLICATION

This application claims benefit of priority to Japanese Patent Application No. 2022-176344, filed on Nov. 2, 2022, the entire context of which is incorporated herein by reference.

BACKGROUND

Technical Field

The present invention relates to a battery case for a vehicle.

Background Art

JP 2021-516187 A discloses a battery case including a framework having a rectangular frame shape in a plan view and a bottom plate joined to a bottom surface of the framework. The battery is housed in a space surrounded by an inner peripheral surface, and an upper surface of the bottom plate, of the framework. In addition, the battery case includes a cooling mechanism for cooling the battery, and the cooling mechanism includes a refrigerant passage through which a liquid refrigerant flows. The refrigerant passage is provided in the bottom portion of a pair of first frames having a rectangular cross section and constituting a part of the framework, and extends along the longitudinal direction of the first frame.

SUMMARY

The refrigerant passage is disposed on the opposite side (that is, the outside) from the space in which the battery is housed when viewed from the inner peripheral surface of the framework. Since the refrigerant passage is far from the battery, it is difficult to obtain high cooling efficiency. When a collision load is applied to the battery case in a direction orthogonal to the longitudinal direction of the first frame, the first frame may receive the load. The load also acts on the portion where the refrigerant passage is provided, and may cause the refrigerant passage to be broken in accordance with the deformation of the first frame. The refrigerant passage is provided above the bottom plate. Therefore, when the refrigerant passage is broken, the refrigerant may infiltrate into the space in which the battery is housed, and the battery may get wet with the refrigerant.

Therefore, an object of the present invention is to improve, in a battery case for a vehicle, cooling performance of a battery, protection performance of a cooling mechanism, or liquid-proof performance of the battery.

An aspect of the present invention provides a battery case for a vehicle including: a frame body having a rectangular frame shape in a plan view; a support plate provided in a lower portion of the frame body, the support plate being configured to support a battery; and a refrigerant passage through which a liquid refrigerant for cooling the battery flows. An inner peripheral surface of the frame body and an upper surface of the support plate define a housing space for housing a battery. The frame body includes a pair of side frames extending in a vehicle length direction. Each of the pair of side frames includes: a base portion extending in an up-down direction and the vehicle length direction and constituting the inner peripheral surface, and an inner protruding portion protruding inward in a vehicle width direction from a lower end of the base portion and extending in the vehicle length direction. The refrigerant passage includes an in-frame passage formed inside the pair of side frames and an in-plate passage communicating with the in-frame passage and formed inside the support plate. The support plate is supported on the inner protruding portion, and the in-frame passage is provided in the inner protruding portion, and is disposed on the inner side in the vehicle width direction with respect to the inner peripheral surface and below the support plate.

According to the above configuration, the support plate defines the housing space of the battery and supports the battery, and the refrigerant passage includes the in-plate passage in the support plate. The refrigerant flowing through the in-plate passage can exchange heat with the battery by solid heat transfer through the support plate, and the cooling performance of the battery is improved. The in-plate passage communicates with an in-frame passage formed inside the frame body. Accordingly, the refrigerant can flow from the in-frame passage to the in-plate passage or vice versa, and the cooling performance can be improved by supplying and discharging the refrigerant to and from the support plate.

Furthermore, the in-frame passage is provided in the inner protruding portion. Therefore, the in-frame passage is disposed on the inner side in the vehicle width direction of the inner peripheral surface (in particular, the inner peripheral surface constituted by the first base portion) of the frame body and below the support plate. Accordingly, when a collision load acts on the vehicle from the side, the first base portions of the side frames receive the load from the side. The first base portion may be deformed so as to be bent toward the frame inner peripheral side, but the inner protruding portion is provided at the lower end of the first base portion and protrudes toward the frame inner peripheral side, and thus is less likely to be affected by a load. Therefore, the in-frame passage is less likely to be broken by the load, and the cooling mechanism is protected. Even if the in-frame passage is broken, since the in-frame passage is positioned below the support plate, the refrigerant leaking from the in-frame passage is less likely to enter the housing space. Therefore, the liquid-proof performance of the battery is also high. In particular, in the present embodiment, since the sealability of the housing space is improved by providing a sealant between the support plate and the inner protruding portion, it is easier to prevent the refrigerant from entering the housing space.

Each of the pair of side frames may include an outer protruding portion that protrudes outward in a vehicle width direction from a lower end of the base portion, extends in the vehicle length direction, and to which a vehicle body frame is attached. An upper surface of the inner protruding portion may be positioned below an upper surface of the outer protruding portion. Accordingly, when a collision load from the side is input to the vehicle, the load acts on a portion above the upper surface of the outer protruding portion in the battery case through the vehicle body frame. When the upper surface of the inner protruding portion is positioned below the upper surface of the outer protruding portion, the load input to the in-frame passage can be significantly reduced, so that the protection performance of the cooling mechanism is improved.

An air layer may be formed below the in-frame passage. Accordingly, the heat insulating property of the in-frame passage is improved, and the cooling performance of the battery is improved.

Each of the pair of side frames may be made of an extruded material, and the in-frame passage may be formed of a hollow portion molded at the time of extrusion and integrated with each of the pair of side frames. Accordingly, a long in-frame passage can be easily achieved along the longitudinal direction of the side frames.

The battery case for the vehicle may further include an undercover to be attached to a lower surface of the inner protruding portion. The refrigerant passage may include a piping material connecting the in-frame passage and the in-plate passage, and the piping material may be housed in a space between the support plate and the undercover. Accordingly, the piping material is disposed in a space isolated from the housing space of the battery by the support plate and isolated from the lower outside of the case by the undercover. It is possible to prevent the piping material from being contaminated with sand gravel or water swirled up from the road surface while the vehicle is traveling, and it is possible to protect the battery from the refrigerant even if the refrigerant leaks from the piping material due to the influence of collision or the like.

A connection port of the in-frame passage with the piping member may be directed in the vehicle width direction. Accordingly, when the piping material is routed in the space between the support plate and the undercover, the piping material becomes compact. In addition, when the in-frame passage is broken, the refrigerant is less likely to go to the housing space above, and the battery can be protected from the refrigerant.

According to the present invention, in a battery case for a vehicle, cooling performance of a battery, protection performance of a cooling mechanism, or liquid-proof performance of the battery can be improved.

DETAILED DESCRIPTION

Figure 1:
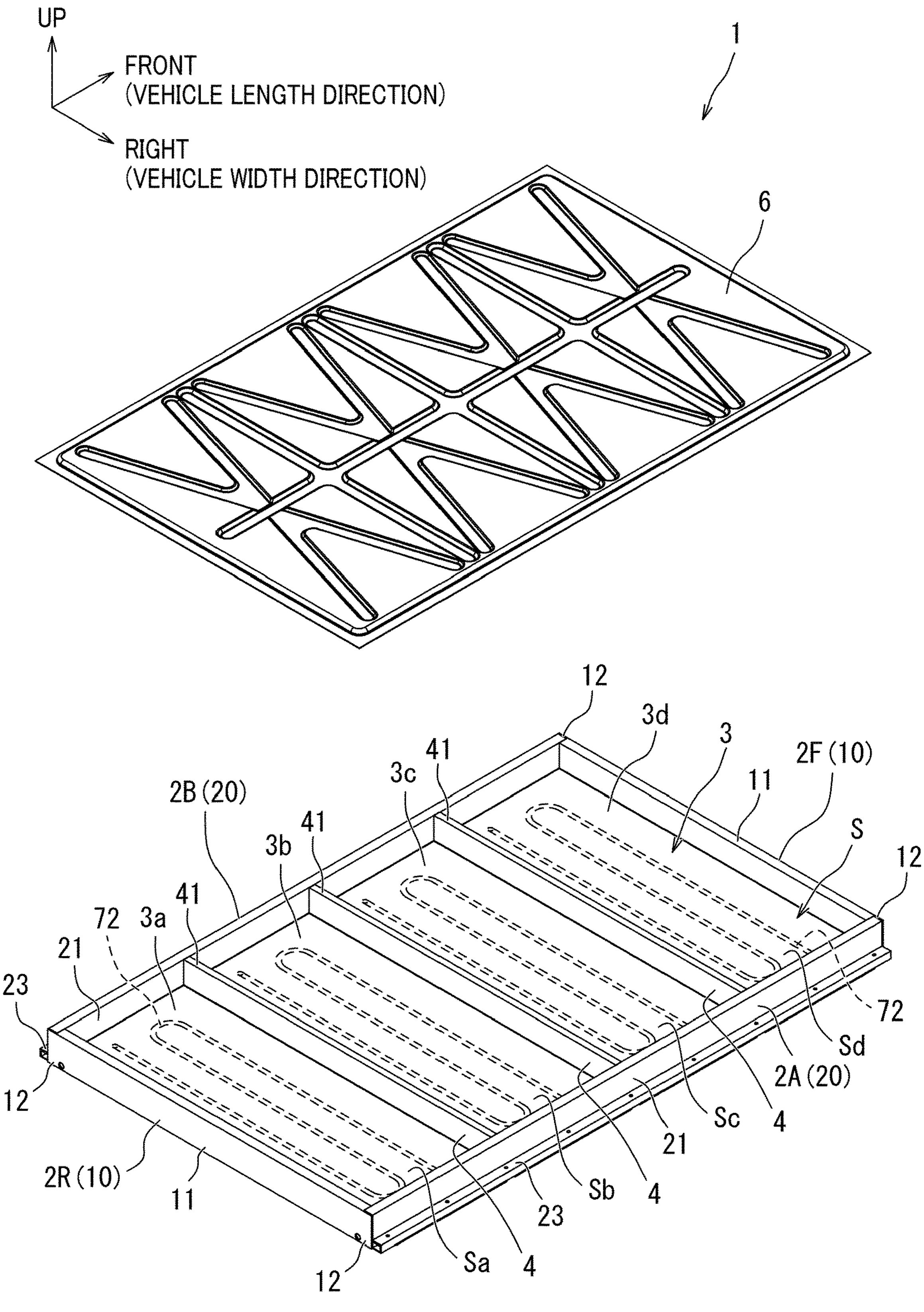
FIG. 1 is an exploded perspective view showing a top cover of a battery case for a vehicle according to a first embodiment.

Hereinafter, embodiments will be described with reference to the drawings. In the following description, a direction is based on the orientation of the vehicle in a state where the battery case 1 according to the present embodiment is mounted on the vehicle (hereinafter, simply referred to as "mounted state") and in a state where the vehicle is grounded to a horizontal ground. The vehicle width direction corresponds to the horizontal left-right direction and corresponds to the "first direction" in the first embodiment, and the vehicle length direction corresponds to the horizontal front-rear direction and corresponds to the "second direction" in the first embodiment. However, this direction can be appropriately changed according to the attitude of the battery case 1 before being mounted on the vehicle or the components thereof, and can be appropriately changed according to the gradient of the ground even in the mounted state.

First Embodiment

Referring to FIGS. 1 to 5, a battery case 1 according to the present embodiment is mounted on a vehicle including an electric motor as a drive source for traveling, and houses a battery B as a power supply of the electric motor. The type of the vehicle on which the battery case 1 can be mounted is not particularly limited, and is a four-wheeled automobile as an example. In this case, the battery case 1 is disposed below a floor panel constituting a floor of the vehicle interior, and is fastened to a pair of side sills 91 constituting a part of the vehicle body 90 of the vehicle. The side sills 91 extend in the vehicle length direction at both edge portions in the vehicle width direction of the vehicle, and the battery case 1 is disposed between the pair of side sills 91.

<Battery Case>

The battery case 1 includes a frame body 2, a support plate 3, one or more cross members 4, an undercover 5, and a top cover 6. In the present embodiment, a plurality of cross members 4 are provided. The support plate 3 is divided into a plurality of support plate segments 3*a* to 3*d*.

The frame body 2 includes a pair of first frames 10 extending in a first direction and a pair of second frames 20 extending in a second direction orthogonal to the first direction, and has a rectangular frame shape in a plan view. The support plate 3 is provided below the frame body 2. The battery B is supported by the support plate 3 and is housed in a housing space S defined by the inner peripheral surface of the frame body 2 and the upper surface of the support plate 3. The plurality of cross members 4 are disposed inside the frame body 2 at intervals in the second direction.

Each cross member 4 extends in the first direction and connects the inner side surfaces of the pair of second frames 20 to each other. The housing space S is divided into a plurality of divided spaces Sa to Sd by being partitioned in the second direction by the plurality of cross members 4. The plurality of support plate segments 3*a* to 3*d* correspond to the plurality of divided spaces Sa to Sd, respectively. The undercover 5 covers the frame body 2 and the support plate 3 from below. The top cover 6 covers the frame body 2 from above.

<Frame Body>

Figure 2:
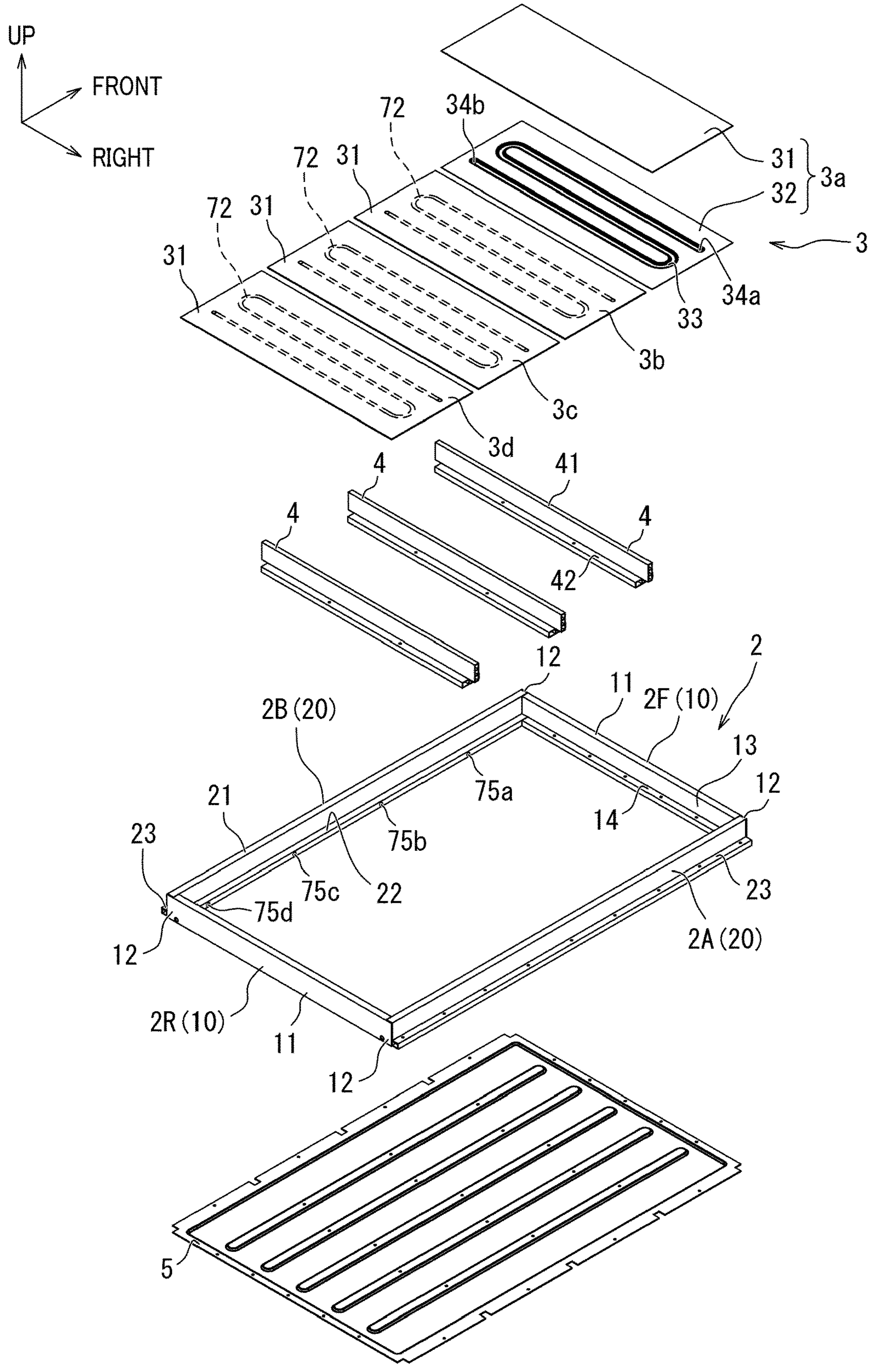
FIG. 2 is an exploded perspective view showing elements other than a top cover of the battery case shown in FIG. 1.
Figure 3:
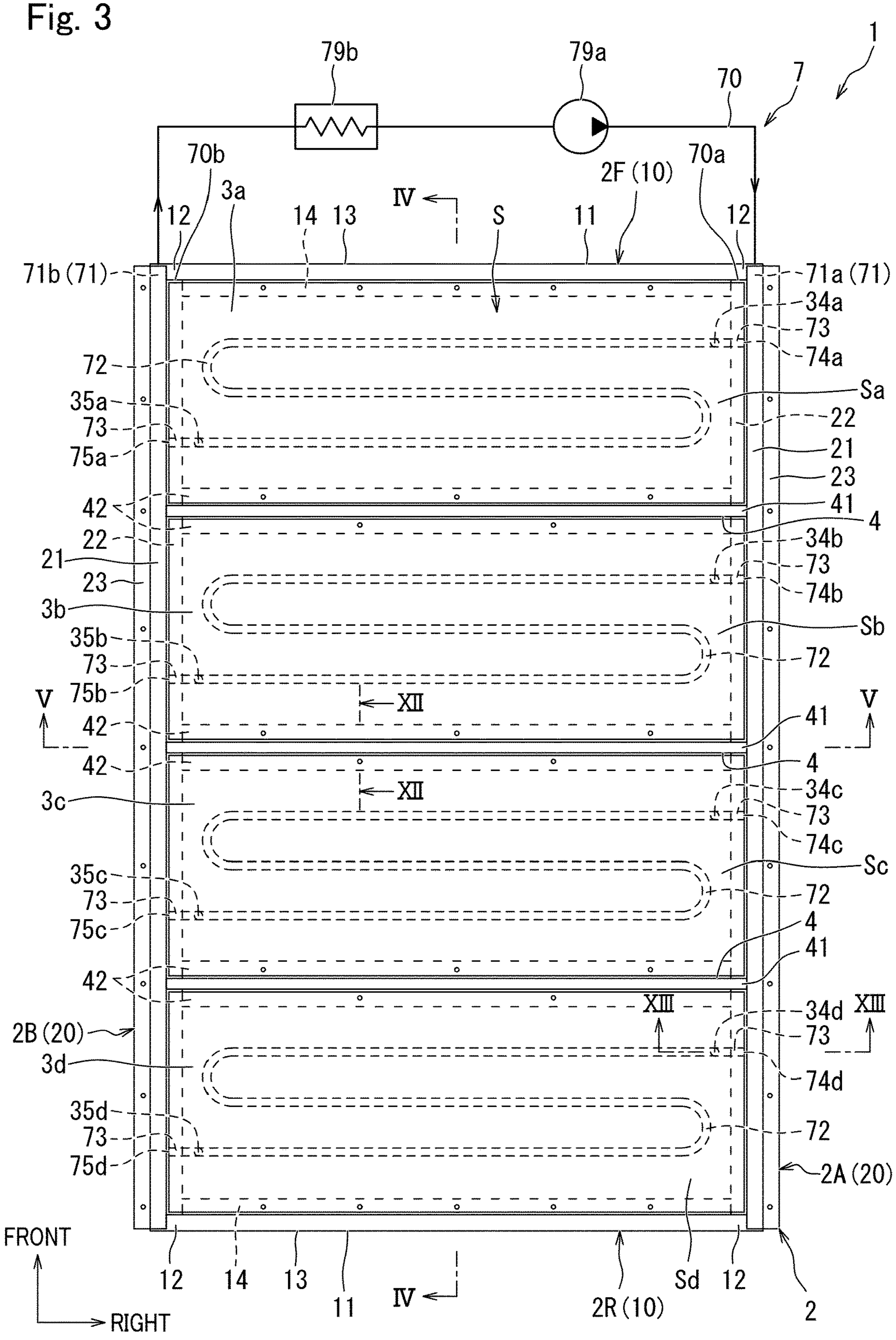
FIG. 3 is a plan view of the battery case shown in FIG. 1.
Figure 4:
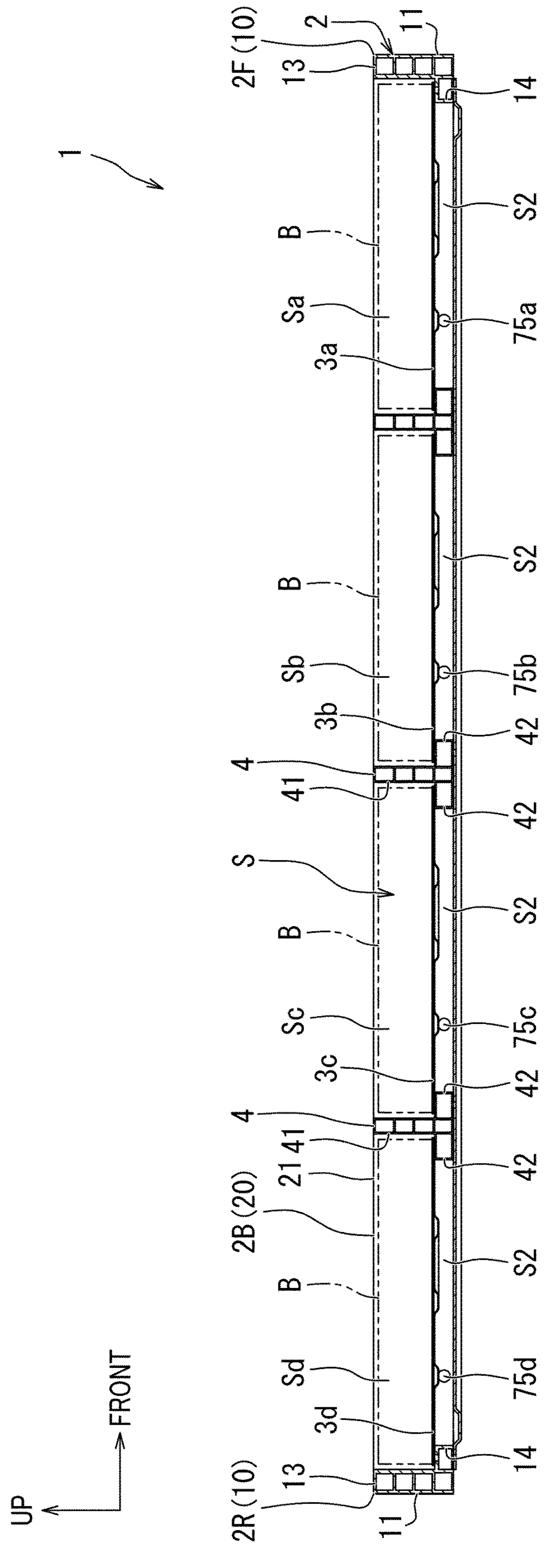
FIG. 4 is a cross-sectional view of the battery case taken along line IV-IV in FIG. 3.
Figure 5:
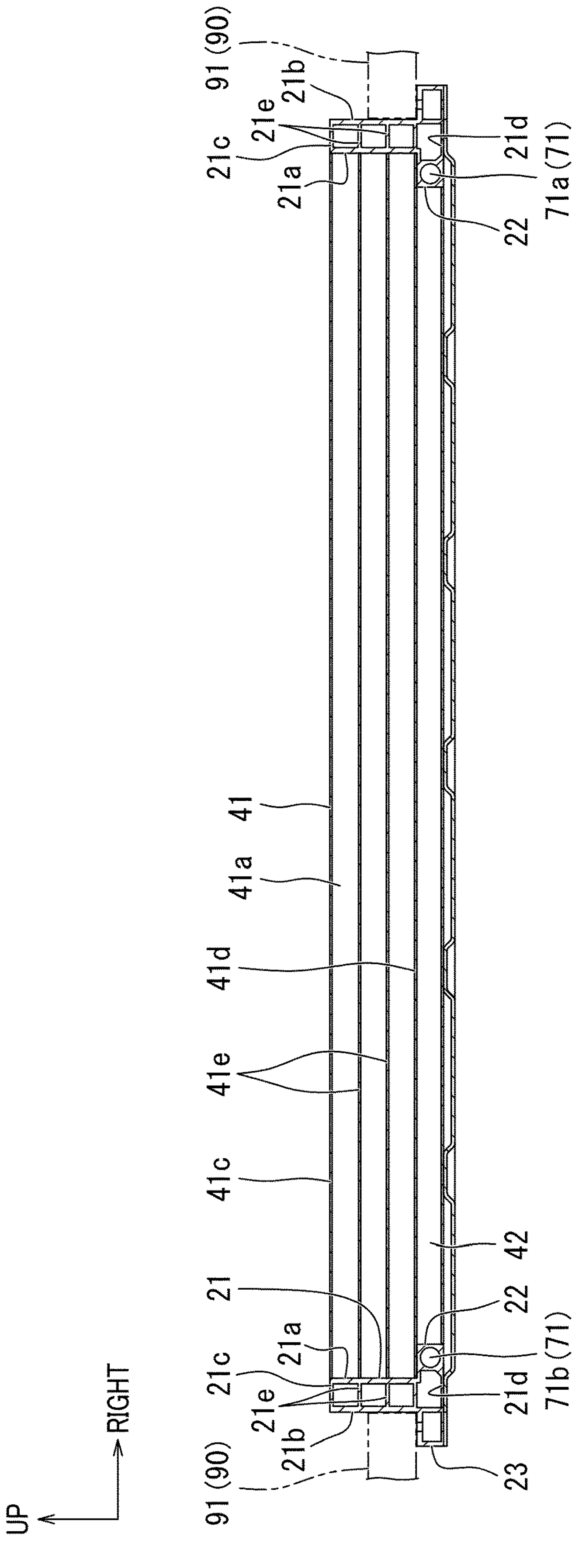
FIG. 5 is a cross-sectional view of the battery case taken along line V-V in FIG. 3.
Figure 6:
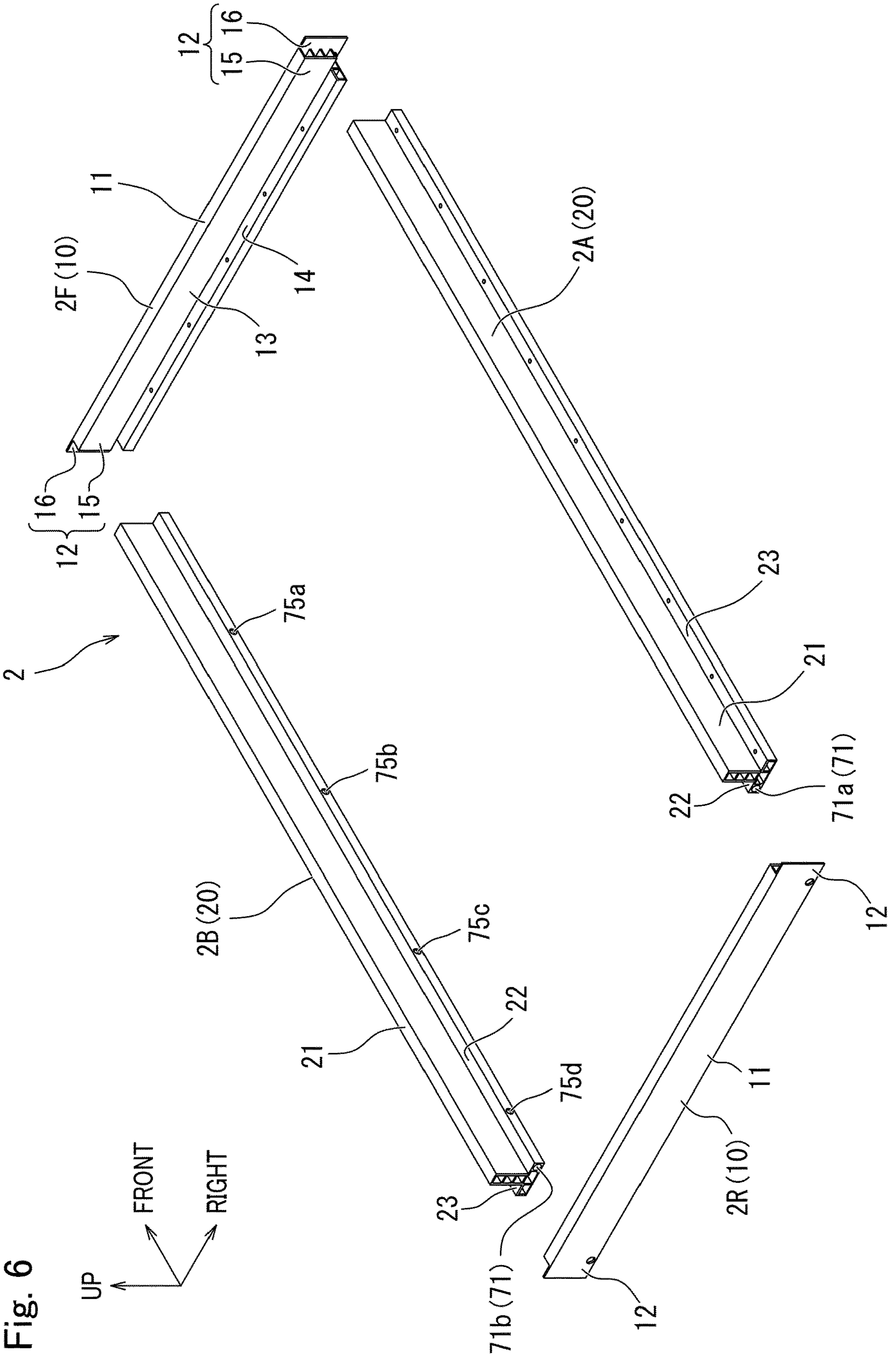
FIG. 6 is an exploded perspective view of the frame body shown in FIG. 2.

Referring to FIGS. 2, 3, and 6, both end portions of one of the first frames 10 connect one end portion of each of a pair of second frames 20. Both end portions of the other of the first frames 10 connect the other end portion of each of the pair of second frames 20. Each of the pair of first frames 10 has a pair of extending portions 12, thereby allowing the first frame 10 and the second frame 20 to be joined in a state of surface contact in both the first direction and the second direction.

In the present embodiment, the first direction is the vehicle width direction, and the second direction is the vehicle length direction. The front and rear frames 2F and 2R are a pair of first frames 10 extending in the first direction (vehicle width direction), and a pair of extending portions 12 is provided at both end portions of each of the front and rear frames 2F and 2R. The pair of side frames 2A and 2B is a pair of second frames 20 extending in the second direction (vehicle length direction). Both end portions of the front frame 2F are joined to the respective front end portions of the pair of side frames 2A and 2B. Both end portions of the rear frame 2R are joined to the respective rear end portions of the pair of side frames 2A and 2B. Accordingly, the four frames 2F, 2R, 2A, and 2B form a rectangular frame shape as a whole. For example, the long side of the frame body 2 extends in the vehicle length direction, and the short side extends in the vehicle width direction.

Here, the "inner peripheral portion" of each of the frames 2F, 2R, 2A, and 2B refers to a portion on the inner peripheral side of the frame body 2 in the width direction orthogonal to the longitudinal direction of the frame 2F, 2R, 2A, or 2B. The "outer peripheral portion" of each of the frames 2F, 2R, 2A, and 2B refers to a portion on the outer peripheral side of the frame body 2 being opposite to the inner peripheral side in the width direction.

For example, in the front frame 2F, the vehicle width direction is the longitudinal direction, the vehicle length direction is the width direction, the rear side is the inner peripheral side of the frame body 2, and the front side is the outer peripheral side of the frame body 2. In the rear frame 2R, the front side is the inner peripheral side, and the rear side is the outer peripheral side. In the side frames 2A and 2B, the vehicle length direction is the longitudinal direction, the vehicle width direction is the width direction, the inner side in the vehicle width direction is the inner peripheral side of the frame body 2, and the outer side in the vehicle width direction is the outer peripheral side of the frame body 2. It should be noted that the inner side in the vehicle width direction is a side approaching the vehicle width center of the vehicle in a state where the battery case 1 is mounted on the vehicle (hereinafter, simply referred to as "mounted state"), and the outer side in the vehicle width direction is a side away from the vehicle width center.

The front and rear frames 2F and 2R as the pair of first frames 10 are configured similarly to each other. The front frame 2F includes a main body portion 11 and a pair of extending portions 12. The main body portion 11 extends in the vehicle width direction. The pair of extending portions 12 extends in the vehicle width direction from both respective end portions of the main body portion 11. The pair of extending portions 12 is continuous with the outer peripheral portion of the main body portion 11.

The main body portion 11 includes a base portion 13 and an inner protruding portion 14. The base portion 13 extends in the vehicle width direction and the up-down direction. The base portion 13 includes a pair of inner side wall 13*a* and outer side wall 13*b*, an upper wall 13*c* that connects upper end portions of the side walls 13*a* and 13*b*, and a lower wall 13*d* that connects lower end portions of the side walls 13*a* and 13*b*. The inner side wall 13*a* constitutes an inner peripheral portion of the front frame 2F and forms an inner peripheral surface of the frame body 2. The outer side wall 13*b* constitutes an outer peripheral portion of the front frame 2F. The base portion 13 has a rectangular cross section including these four walls 13*a* to 13*d*. The base portion 13 further includes one or more partition walls 13*e* extending in the vehicle width direction between the upper wall and the lower wall in the up-down direction. The inner protruding portion 14 protrudes toward the inner peripheral side from the lower end portion of the base portion 13 and extends in the vehicle width direction.

Figure 7:
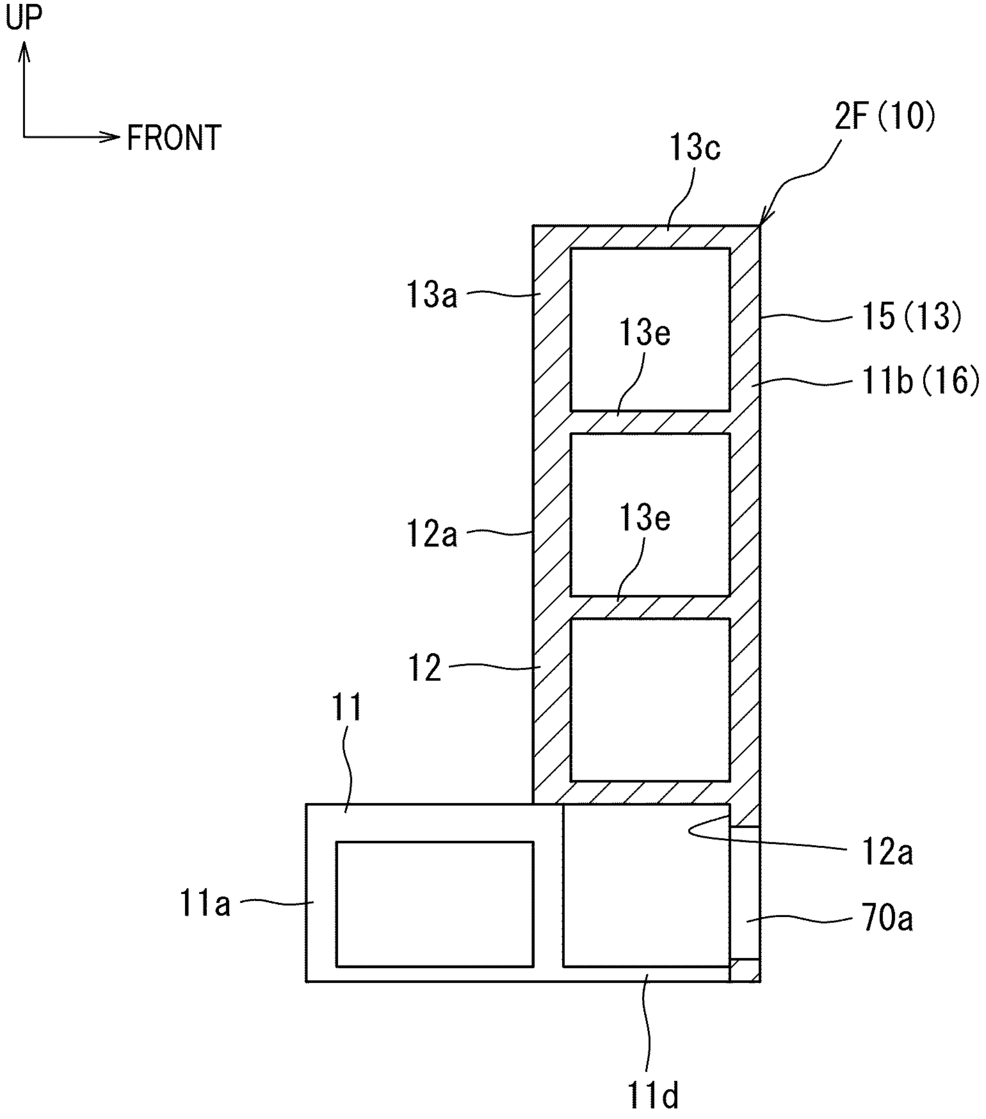
FIG. 7 is a cross-sectional view of an extending portion of the front frame as a first frame shown in FIG. 6.
Figure 8:
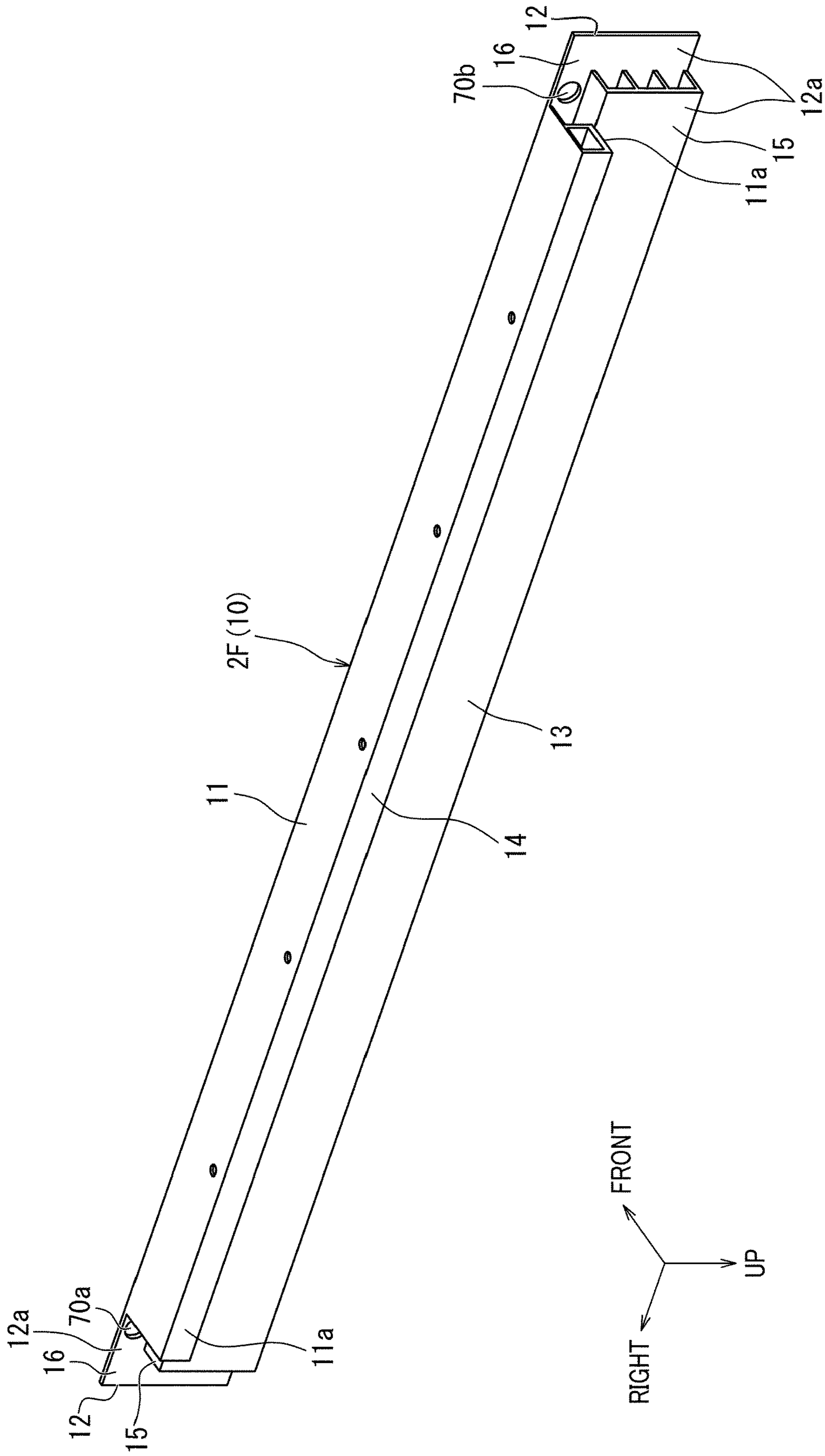
FIG. 8 is a perspective view showing the front frame as the first frame shown in FIG. 6 as viewed from below.

Referring also to FIGS. 7 and 8, each of the pair of extending portions 12 includes a closed cross-sectional portion 15 and a plate-shaped portion 16. The closed cross-sectional portion 15 is configured by extending the base portion 13. The plate-shaped portion 16 is configured by extending the outer side wall 13*b* of the base portion 13. The closed cross-sectional portion 15 is positioned above the inner protruding portion 14. The plate-shaped portion 16 is positioned below the closed cross-sectional portion 15 and on the tip side in the vehicle width direction, and has an L shape when viewed from the vehicle length direction. It should be noted that the tip side in the vehicle width direction refers to the right side in the extending portion 12 provided at the right end portion of the front frame 2F, and refers to the left side in the extending portion 12 provided at the left end portion of the front frame 2F.

In the present embodiment, the front frame 2F is made of an extruded material. The material of the front frame 2F is not particularly limited. Considering various design requirements such as weather resistance, strength, weight, and moldability, the 6000 series aluminum alloy is one of preferable examples of the material of the front frame 2F. The extending portion 12 is formed by cutting a frame material obtained by extrusion molding. The original shape of the frame material has a uniform cross section equivalent to that of the main body portion 11 from end to end in the longitudinal direction. By applying cutting work to both end portions of such a frame material, a pair of extending portions 12 is integrally molded with the main body portion 11, and the front frame 2F is manufactured.

The inner protruding portion 14 included in the main body portion 11 has a pair of end surfaces 11*a* directed outward in the vehicle width direction. Each of the pair of extending portions 12 has an inner side surface 12*a* directed toward the inner peripheral side. In particular, the plate-shaped portion 16 forms an L-shaped inner side surface. The end surface 11*a* of the inner protruding portion 14 is orthogonal to the inner side surface 12*a* of the extending portion 12 (in particular, the plate-shaped portion 16).

The rear frame 2R is disposed rotationally symmetric about a virtual axis in the up-down direction by 180 degrees with respect to the front frame 2F. The pair of extending portions 12 is provided in the outer peripheral portion (rear portion) of the rear frame 2R.

Figure 9:
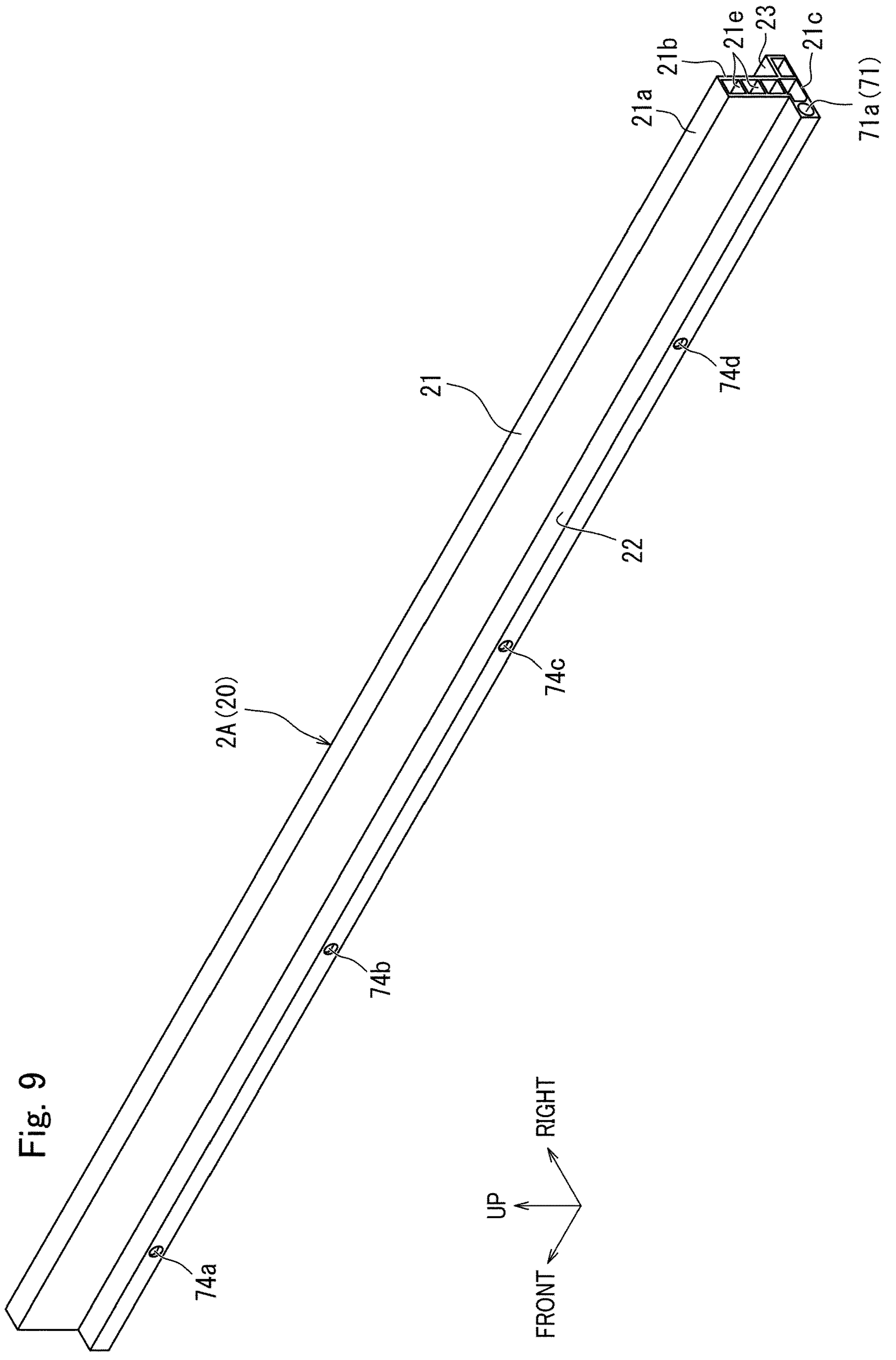
FIG. 9 is a perspective view showing a right side frame as a second frame shown in FIG. 6 as viewed from the left.

Referring also to FIG. 9, each of the side frames 2A and 2B has a base portion 21, an inner protruding portion 22, and an outer protruding portion 23. The base portion 21 extends in the vehicle length direction and the up-down direction. The base portion 21 includes a pair of inner side wall 21*a* and outer side wall 21*b*, an upper wall 21*c* that connects upper end portions of the side walls 21*a* and 21*b*, and a lower wall 21*d* that connects lower end portions of the side walls 21*a* and 21*b*. The inner side wall 21*a* constitutes the inner peripheral portion of each of the side frames 2A and 2B and forms the inner peripheral surface of the frame body 2. The outer side wall 21*b* constitutes an outer peripheral portion of each of the side frames 2A and 2B. The base portion 21 has a rectangular cross section including these four walls 21*a* to 21*d*. The base portion 21 further includes one or more partition walls 21*e* extending in the vehicle length direction between the upper wall 21*c* and the lower wall 21*d* in the up-down direction. In the present embodiment, as a mere example, the two partition walls 21*e* are disposed apart from each other in the up-down direction so as to divide the hollow surrounded by the four walls 21*a* to 21*d* into three equal parts in the up-down direction.

The outer protruding portion 23 protrudes toward the outer peripheral side (outside in the vehicle width direction) from the lower end portion of the base portion 21. The outer protruding portion 23 is fixed to the vehicle body 90, particularly to the side sill 91 constituting a part thereof. Accordingly, the battery case 1 is in a mounted state. The side sill 91 has a rectangular cross section and extends in the vehicle length direction. The upper surface of the outer protruding portion 23 is in contact with the lower surface of the side sill 91 in the up-down direction, and the outer peripheral surface of the base portion 21 is in contact with the inner side surface of the side sill 91. In this state, the frame body 2 is fastened to the side sill 91 with a bolt inserted through the outer protruding portion 23 from the bottom to the top.

The inner protruding portion 22 protrudes toward the inner peripheral side (inside in the vehicle width direction) from the lower end portion of the base portion 21 and extends in the vehicle width direction. The base portion 21 and the inner protruding portion 22 form flush end surfaces at both end portions in the vehicle length direction, and form flush lower surfaces. The side surface of the inner protruding portion 22 is offset in the vehicle width direction by the protruding amount from the base portion 21 of the inner protruding portion 22 with respect to the side surface of the base portion 21. The side surface of the inner protruding portion 22 is continuous with the side surface of the base portion 21 through the upper surface of the inner protruding portion 22.

Figure 10A:
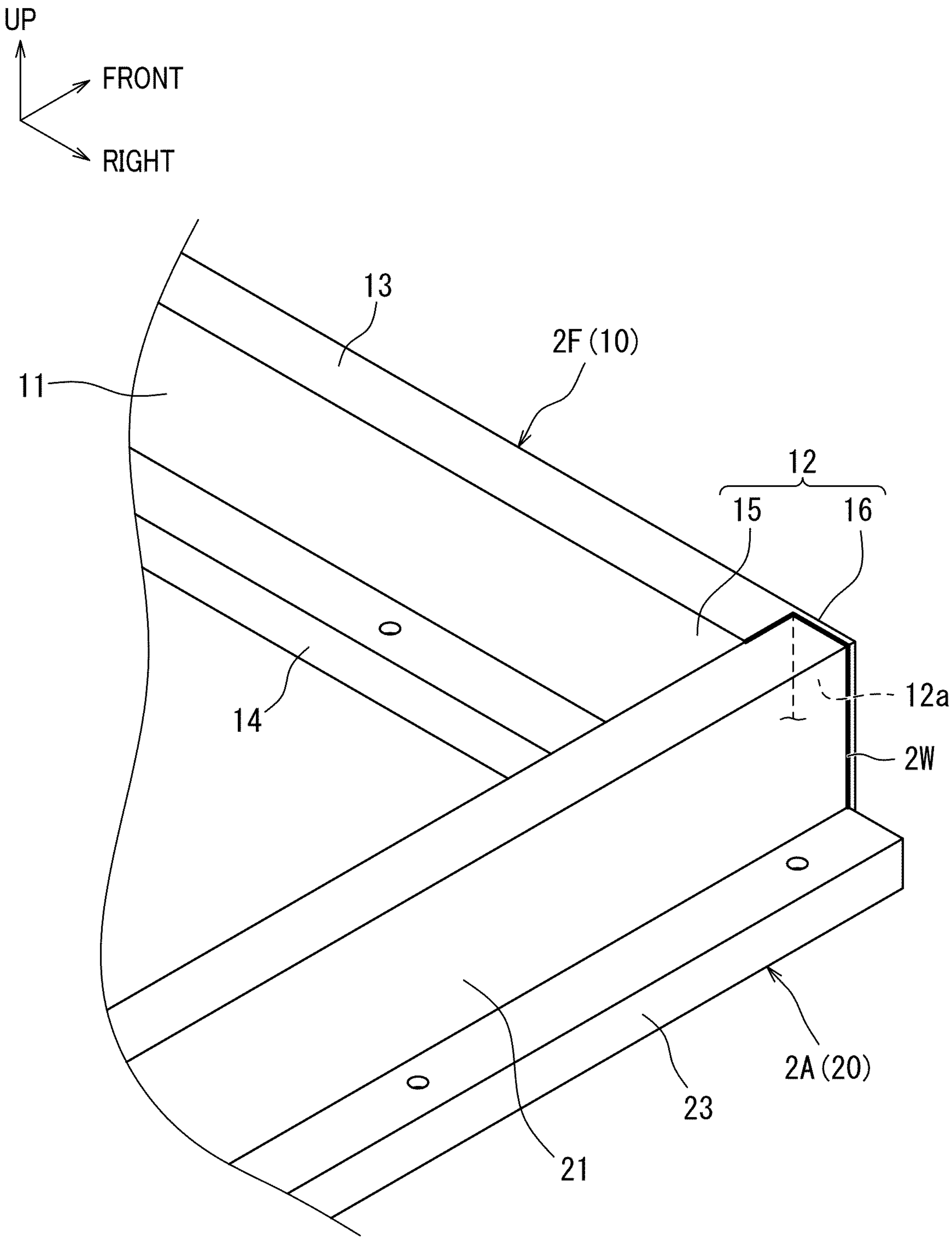
FIG. 10A is a perspective view showing a corner portion of the frame body shown in FIG. 2 as viewed from above.
Figure 10B:
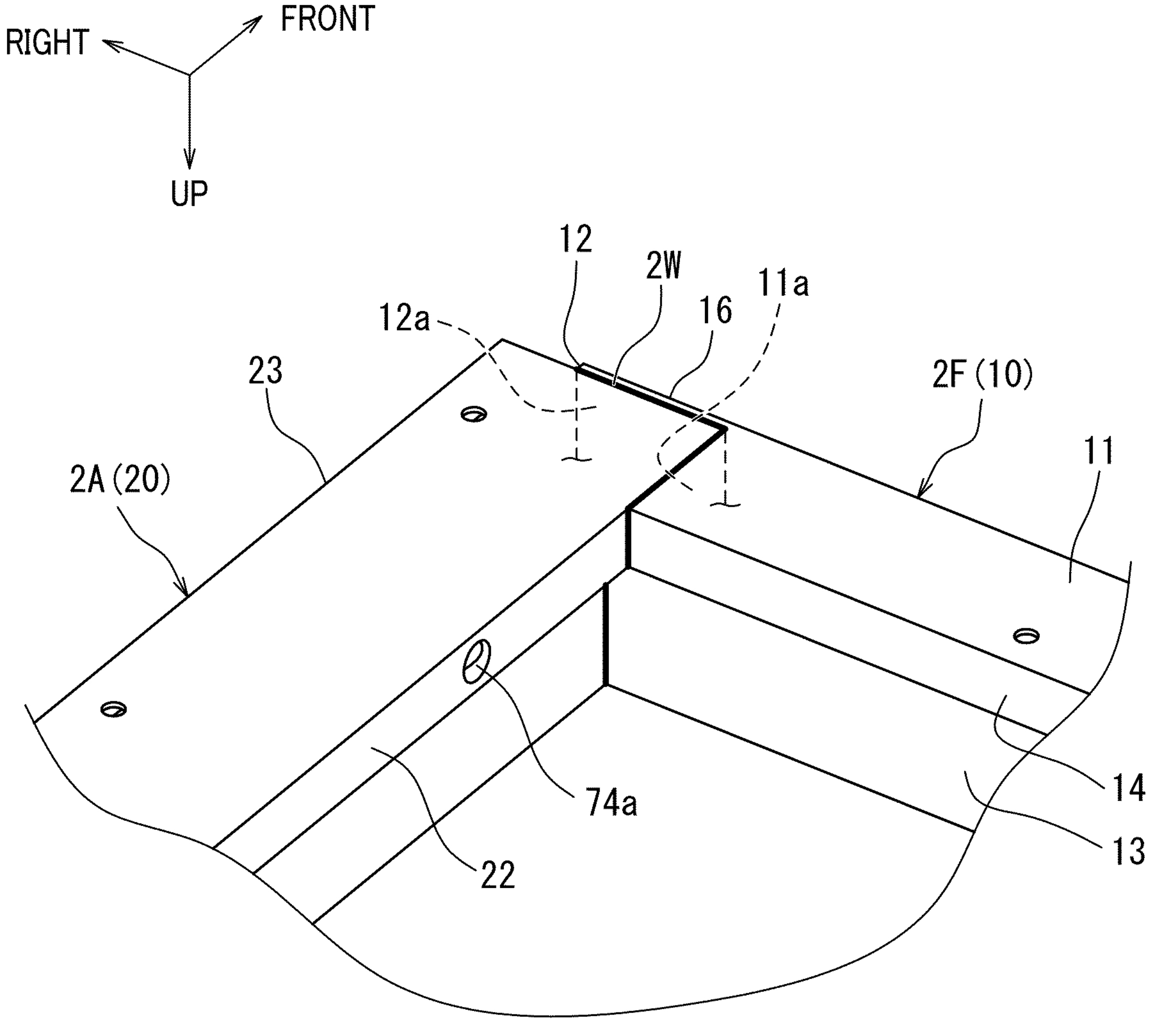
FIG. 10B is a perspective view showing a corner portion of the frame body shown in FIG. 2 as viewed from below.

Referring also to FIGS. 10A and 10B, the front end portion of the right side frame 2A is joined to the right end portion of the front frame 2F. At this time, the side surface of the inner protruding portion 22 is brought into surface contact with the end surface 11*a* of the inner protruding portion 14 as the main body portion 11. In addition, the front end surface of the right side frame 2A is brought into surface contact with the inner side surface 12*a* of the plate-shaped portion 16 as the extending portion 12. The front end surface of the base portion 21 of the right side frame 2A is in contact with a portion closer to the tip side (right side) in the vehicle width direction than the closed cross-sectional portion 15, in the L-shaped plate-shaped portion 16. The front end surface of the inner protruding portion 22 of the right side frame 2A is in contact with a portion below the closed cross-sectional portion 15, in the L-shaped plate-shaped portion 16. The outer protruding portion 23 of the right side frame 2A is not contact with the front frame 2F and protrudes toward outside (right side) in the vehicle width direction from a corner portion formed by the front frame 2F and the right side frame 2A. The side surface of the base portion 21 of the right side frame 2A is in surface contact with the end surface of the closed cross-sectional portion 15. The upper surface of the inner protruding portion 22 of the right side frame 2A may be in surface contact with the lower surface of the closed cross-sectional portion 15, or may be opposed to the lower surface of the closed cross-sectional portion 15 in the up-down direction with a slight clearance apart.

Welding is suitably applied to joining. In this case, the weld line serves as the joint portion 2W where the right side frame 2A and the front frame 2F are joined. The weld line extends, for example, at the following place. (1) The boundary between the end surface of the base portion 21 and the outer surface of the plate-shaped portion 16, (2) the boundary between the upper surface of the base portion 21 and the upper surface of the closed cross-sectional portion 15, (3) the boundary between the side surface of the base portion 21 and the inner side surface of the closed cross-sectional portion 15, (4) the boundary between the upper surface of the inner protruding portion 22 and the inner side surface of the closed cross-sectional portion 15, (5) the boundary between the upper surface of the inner protruding portion 22 and the upper surface of the inner protruding portion 14, and (6) the boundary between the side surface of the inner protruding portion 22 and the side surface of the inner protruding portion 14.

In this manner, the front end portion of the right side frame 2A is joined to the front frame 2F in a state where the end surface thereof is in surface contact with the inner side surface 12*a* of the extending portion 12 at the right end portion of the front frame 2F and the side surface thereof is in surface contact with the end surface 11*a* of the main body portion 11. The same applies to a set of the rear end portion of the right side frame 2A and the right end portion of the rear frame 2R, a set of the front end portion of the left side frame 2B and the left end portion of the front frame 2F, and a set of the rear end portion of the left side frame 2B and the left end portion of the rear frame 2R.

<Cross Member>

Figure 11:
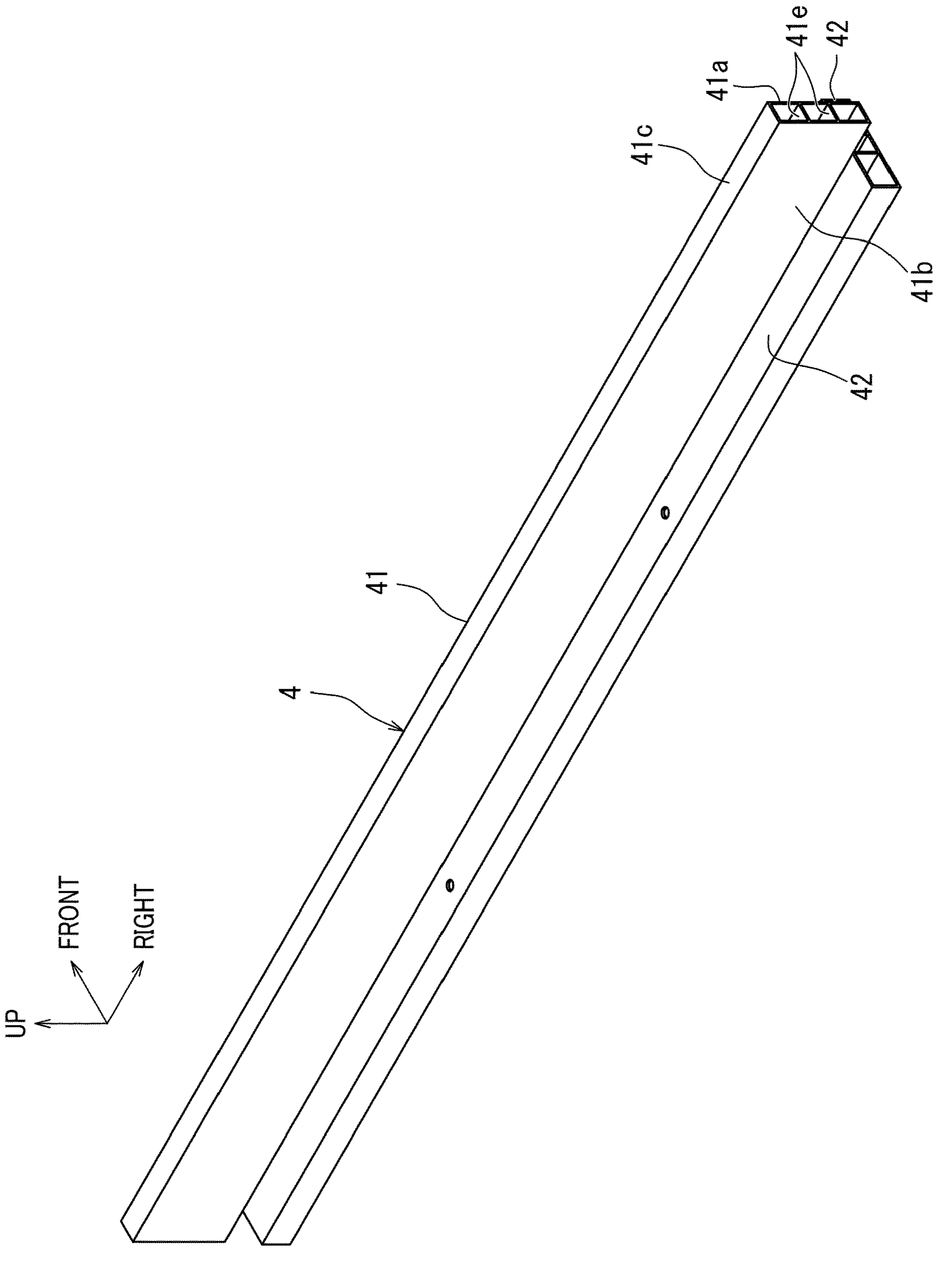
FIG. 11 is a perspective view of the cross member shown in FIG. 2.
Figure 12:
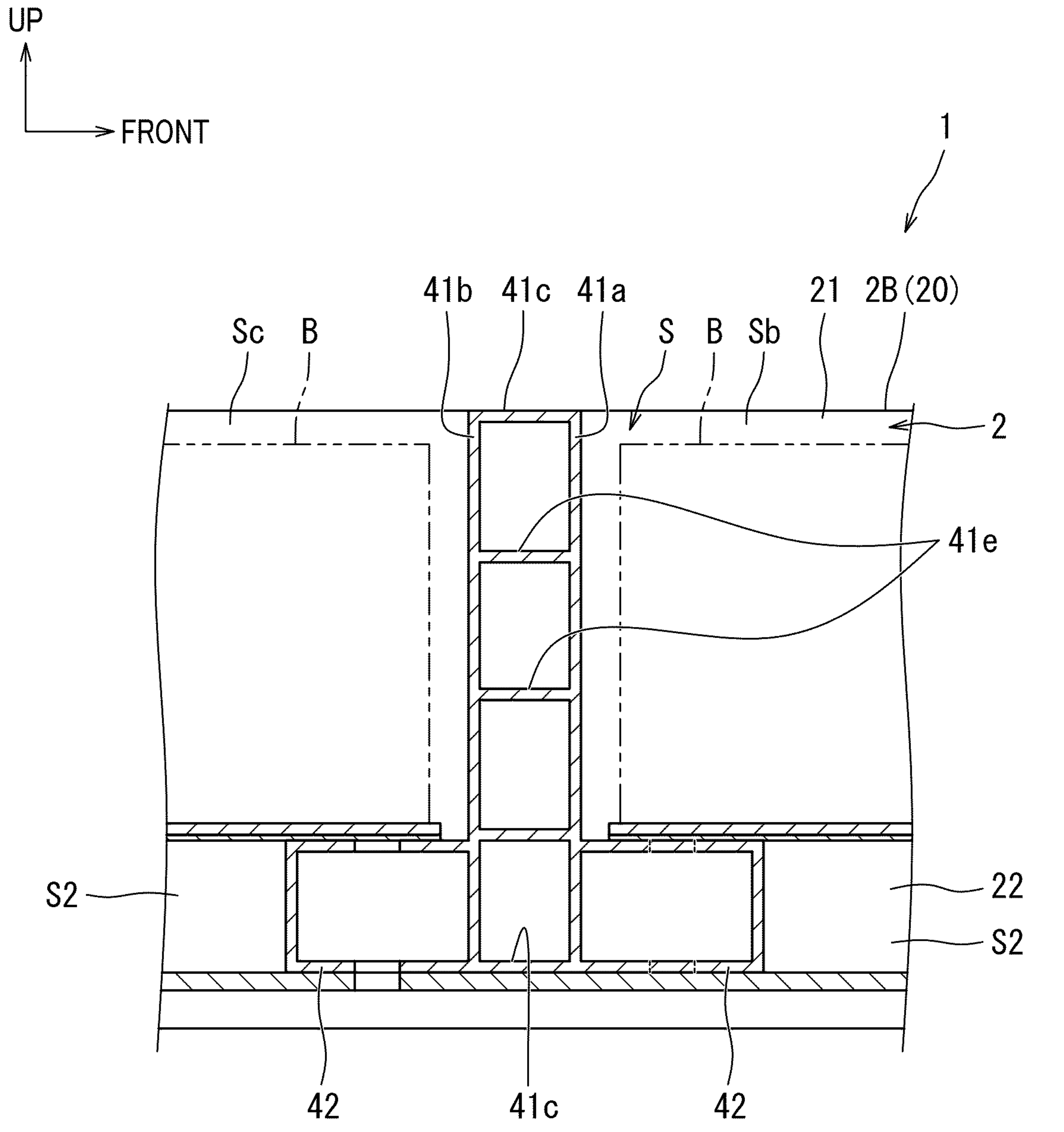
FIG. 12 is a cross-sectional view of the battery case taken along line XII-XII in FIG. 3.

Referring to FIGS. 11 and 12, a plurality of cross members 4 have the same structure as each other. The cross member 4 is made of an extruded material. Since the cross member 4 is provided in a housing space having sealability, the cross member 4 is allowed to use a material having low water resistance or weather resistance. Accordingly, emphasis on strength and lightness is allowed, and the 7000 series aluminum alloy can be suitably used as a material of the cross member 4.

The cross member 4 includes a partition wall portion 41 and a pair of protruding portions 42. In the present embodiment, the partition wall portion 41 and the pair of protruding portions 42 are integrally molded by extrusion molding and continuously connected to each other seamlessly.

The partition wall portion 41 extends in the vehicle width direction and the up-down direction. The partition wall portion 41 has a rectangular cross section, and the long side of the cross section extends in the up-down direction and the short side extends in the vehicle length direction. The partition wall portion 41 includes a pair of side walls 41*a* and 41*b*, an upper wall 41*c* that connects upper end portions of the side walls 41*a* and 41*b*, and a lower wall 41*d* that connects lower end portions of the side walls 41*a* and 41*b*. The pair of side walls 41*a* and 41*b* forms a pair of side surfaces of the partition wall portion 41. The pair of protruding portions 42 protrudes from the lower end portion of the partition wall portion 41 to both sides in the vehicle length direction more than both side surfaces of the partition wall portion 41 and extends in the vehicle width direction. In the present embodiment, the lower surface of the partition wall portion 41 is flush with the lower surfaces of the pair of protruding portions 42, and the cross member 4 has an inverted T-shaped cross section.

Both end surfaces of the cross member 4 in the vehicle width direction are joined to the pair of respective side frames 2A and 2B in a state of being in surface contact with or facing closely the respective inner side surfaces of the pair of side frames 2A and 2B. In the present embodiment, the pair of side frames 2A and 2B includes the inner protruding portions 22. Therefore, the lower portion (the inner side surface of the inner protruding portion 22) of the inner side surface of each of the side frames 2A and 2B is offset, in the vehicle width direction, at the upper portion (the inner side surface of the base portion 21) of the inner side surface. In this embodiment, both end portions of the partition wall portion 41 protrude to both sides in the vehicle width direction with respect to the pair of protruding portions 42. Both end surfaces of the partition wall portion 41 are joined to inner side surfaces of the base portions 21 of the pair of side frames 2A and 2B. Both end surfaces of the pair of protruding portions 42 are joined to inner side surfaces of the inner protruding portions 22 of the pair of side frames 2A and 2B. Accordingly, the upper surfaces of the inner protruding portions 22 of the side frames 2A and 2B are flush with the upper surfaces of the pair of protruding portions 42 of the cross member 4. These four upper surfaces have rectangular frame shapes in a plan view.

By joining the plurality of cross members 4 to the frame body 2 in this manner, the housing space S is divided into the number of divided spaces Sa to Sd larger by one than the number of cross members 4. The plurality of divided spaces Sa to Sd are arranged in a direction (vehicle length direction) orthogonal to a direction (vehicle width direction) in which the cross members 4 extend in parallel.

The partition wall portion 41 has a rectangular cross section constituted by the four walls 41*a* to 41*d*, and further includes one or more partition walls 41*e* extending in the vehicle width direction between the upper wall 41*c* and the lower wall 41*d* in the up-down direction. In the present embodiment, the partition wall portion 41 includes two partition walls 41*e*, and the base portions 21 of the side frames 2A and 2B to be joined to the partition wall portion 41 also include two partition walls 21*e*. In the mounted state (or, the assembled state of the battery case 1), the partition wall 41*e* of the partition wall portion 41 is at the same position in the up-down direction as the partition wall 21*e* of the base portion 21. Therefore, the load input from the side to the side frames 2A and 2B can be smoothly transferred from the partition wall 21*e* to the partition wall 41*e*, and the cross member 4 can receive the load.

<Support Plate>

With reference to FIGS. 2, 3, 12, and 13, each of the support plate segments 3*a* to 3*d* is disposed in a corresponding one of the divided spaces Sa to Sd, is supported on the upper surfaces of the inner protruding portions 22 of the pair of respective side frames 2A and 2B, and is supported on the upper surfaces of the pair of respective protruding portions 42 of the cross members 4. Between the outer peripheral edge portions of the support plate segments 3*a* to 3*d* and the upper surfaces thereof, a sealing agent may be applied after line joining such as welding is performed. Accordingly, the housing space S above the support plate 3 is sealed from the space below the support plate 3, and the sealability (waterproofness and dustproofness) of the housing space S is improved.

<Undercover>

In the present embodiment, the undercover 5 includes a single component, and entirely covers the frame body 2 and the support plate 3 from below. The undercover 5 is fastened to the lower surface of the frame body 2 and the lower surface of the cross member 4.

Accordingly, a space S2 is formed between the support plate 3 and the undercover 5. The space S2 is positioned below the divided spaces Sa to Sd with interposition of the support plate segments 3*a* to 3*d*, and has the same height as the protruding portion 42 of the cross member 4 or the inner protruding portion 22 of the frame body 2.

It should be noted that as will be described below, in the present embodiment, since the cross member 4 includes a partition wall portion and a pair of protruding portions, the strength of the battery case 1 is improved, and the partition wall portion disposed in the housing space S is allowed to be thin. In view of this, in comparison with the conventional form, it is conceivable to adopt (1) a form in which the number of cross members 4 is increased to further improve the strength and maintain the load efficiency (that is, the sum total of the widths of the cross members 4), and (2) a form in which the number of cross members 4 is maintained to reduce the sum total of widths of the cross members 4, thereby improving both the strength and the load efficiency.

On the other hand, a plurality of fastening points through which bolts are inserted for fastening with the undercover 5 are set on the lower surface of each cross member 4. In any of the forms (1) and (2), it is possible to shorten the intervals in the vehicle length direction (direction orthogonal to the longitudinal direction of the cross member 4) of the fastening points as a whole of the battery case 1. Accordingly, when the battery case 1 receives a load from the road surface, the strength of the undercover 5 can be secured.

In the form (1), as a mere example, a plurality of fastening points may form one row of fastening point row linearly arranged in the vehicle width direction on the lower surface of each cross member 4. Since the number of cross members 4 is increased, intervals between adjacent fastening point rows are narrowed when the battery case 1 is viewed as a whole, and strength against a collision load is improved. In the form (2), as a mere example, a plurality of fastening points may form two rows of fastening point rows linearly arranged in the vehicle width direction on the lower surface of each cross member 4. In this case, the two rows of fastening point rows are set, for example, on the lower surface of each of the pair of protruding portions 42. Accordingly, the number of fastening point rows can be increased while reducing the number of cross members 4, and the strength against the collision load is improved.

<Cooling Mechanism>

Figure 13:
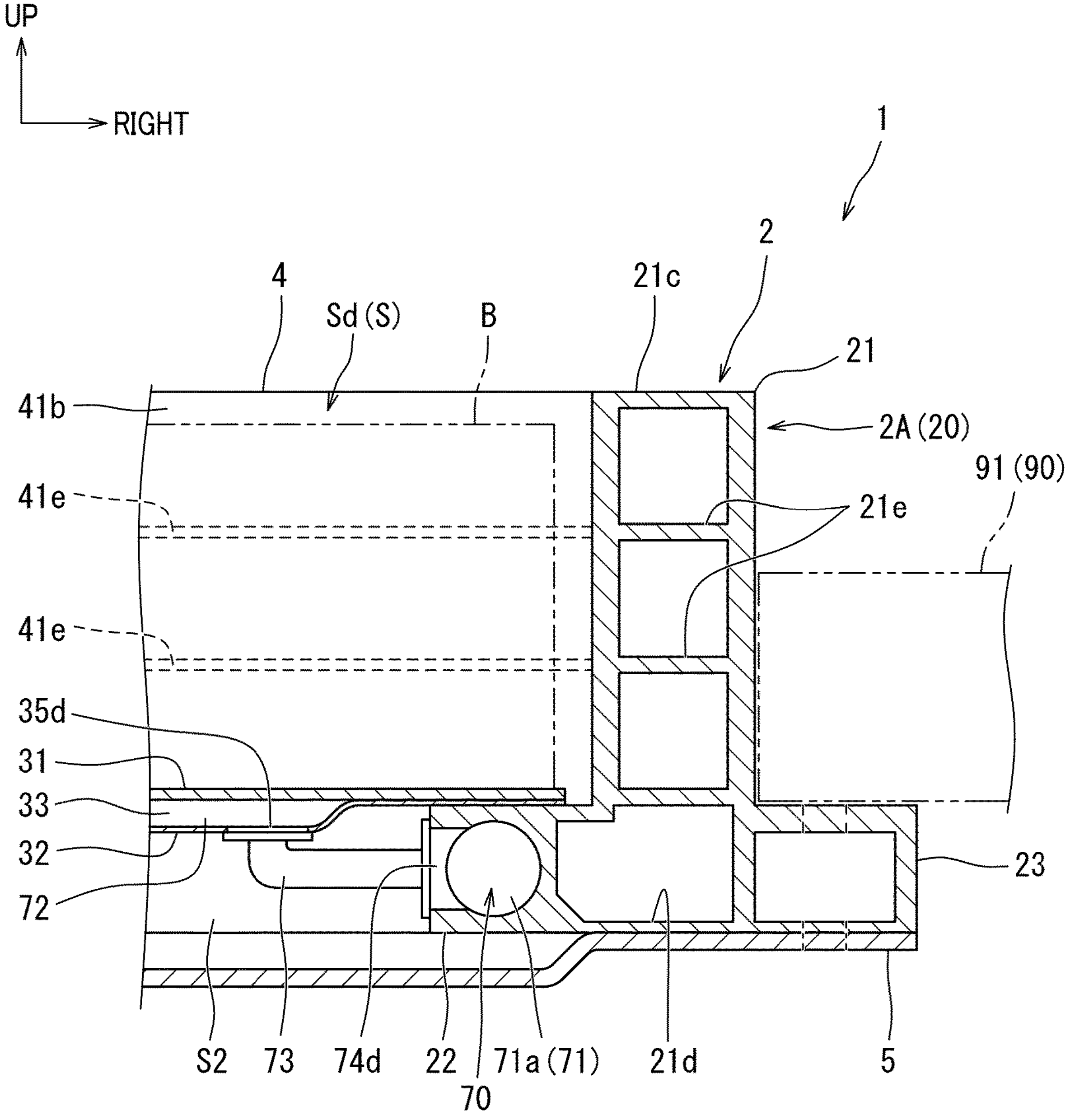
FIG. 13 is a cross-sectional view of the battery case taken along line XIII-XIII in FIG. 3.

Referring to FIGS. 3 and 13, the battery case 1 is provided with a cooling mechanism 7 that cools the battery B housed in the housing space S. The cooling mechanism 7 is of a liquid-cooled type and includes a refrigerant passage 70 that allows a liquid refrigerant to flow. The refrigerant is, for example, a long life coolant obtained by mixing ethylene glycol with water. A pump 79*a* for pressure-feeding the refrigerant and a radiator 79*b* for cooling the refrigerant are provided outside the battery case 1, and are connected to a refrigerant passage 70 present in the battery case 1 through a hose routed outside the battery case 1.

The battery case 1 is provided with an inlet 70*a* and an outlet 70*b* to which piping materials outside the battery case 1 are connected. The refrigerant passage 70 allows the refrigerant to flow from the inlet 70*a* to the outlet 70*b*. The inlet 70*a* and the outlet 70*b* are provided in the frame body 2. The pair of first frames 10 (in the present embodiment, corresponding to the front and rear frames 2F and 2R.) of the frame body 2 has a total of four extending portions 12, the inlet 70*a* is provided in the extending portion 12 on one side of any one of the pair of first frames 10, and the outlet 70*b* is provided in the extending portion 12 on the other side of any one of the pair of first frames 10. Since the number of options for the inlet 70*a* is 4 and the number of options for the outlet 70*b* is 2 for one inlet 70*a*, there are eight combinations of the arrangement of the inlet 70*a* and the outlet 70*b*, and any of them may be adopted. As a mere example, in the present embodiment, the inlet 70*a* is provided in the extending portion 12 on the right side of the front frame 2F, and the outlet 70*b* is provided in the extending portion 12 on the left side of the front frame 2F.

The refrigerant passage 70 includes an in-frame passage 71 formed inside the pair of side frames 2A and 2B, an in-plate passage 72 communicating with the in-frame passage 71 and formed inside the support plate 3, and a piping material 73 connecting the in-frame passage and the 71 in-plate passage 72. As described above, the refrigerant passes through the inside of the support plate 3, and the refrigerant exchanges heat with the battery B supported on the support plate 3 by solid heat transfer through the support plate 3. The support plate 3 functions as not only supporting the battery B but also as a cooling plate that takes heat away from the battery B.

The in-frame passage 71 includes an inflow passage 71*a* communicating with the inlet 70*a* and an outflow passage 71*b* communicating with the outlet 70*b*. The inflow passage 71*a* and the outflow passage 71*b* are provided separately in a pair of second frames 20 (in the present embodiment, corresponding to the pair of side frames 2A and 2B). The inflow passage 71*a* is provided in the second frame 20 on one side where the inlet 70*a* is provided, of the pair of second frames 20. The outflow passage 71*b* is provided in the second frame 20 on the other side where the outlet 70*b* is provided, of the pair of second frames 20. In the present embodiment, as a mere example, the inlet 70*a* is provided in the right extending portion 12 of the front frame 2F, and the inflow passage 71*a* is provided in the right side frame 2A. The outlet 70*b* is provided in the left extending portion 12 of the rear frame 2R, and the outflow passage 71*b* is provided in the left side frame 2B.

The inflow passage 71*a* and the outflow passage 71*b* are provided in the inner protruding portions 22 of the respective second frames 20 (in the present embodiment, corresponding to the pair of side frames 2A and 2B). In the present embodiment, the respective side frames 2A and 2B are integrally molded with an extruded material, and the inner protruding portion 22 forms a hollow portion extending along the extending direction of the second frame 20. The in-frame passage 71 (the inflow passage 71*a* and the outflow passage 71*b*) includes a hollow portion formed at the time of extrusion in this manner.

Each of the support plate segments 3*a* to 3*d* has a rectangular shape in a plan view. Each of the support plate segments 3*a* to 3*d* includes a lid plate 31 and a groove forming plate 32. The groove forming plate 32 has a groove 33 extending in a meandering manner, and the groove 33 is closed by superposing the lid plate 31 on the groove forming plate 32 to form the in-plate passage 72. The groove forming plate 32 includes inflow connection ports 34*a* to 34*d* that open one end portion of the groove 33 to the outside and outflow connection ports 35*a* to 35*d* that open the other end portion of the groove 33 to the outside. One end portion of the groove 33, eventually the inflow connection ports 34*a* to 34*d*, are arranged on one side (in the present embodiment, the right side) in the vehicle width direction of the support plate 3, and the other end portion of the groove 33, eventually the outflow connection ports 35*a* to 35*d*, are arranged on the other side (in the present embodiment, the left side) in the vehicle width direction of the support plate 3.

The inflow passage 71*a* is opened to the outside through a plurality of outflow connection ports 74*a* to 74*d* arranged in the vehicle length direction. The outflow connection ports 74*a* to 74*d* are arranged apart from each other at substantially equal intervals, and correspond to the plurality of divided spaces Sa to Sd, eventually the plurality of support plate segments 3*a* to 3*d*, on a one-to-one basis. The same applies to the outflow passage 71*b*. The outflow passage 71*b* is opened to the outside at the plurality of inflow connection ports 75*a* to 75*d*, and the plurality of inflow connection ports 75*a* to 75*d* are arranged at equal intervals in the vehicle length direction, and correspond to the plurality of divided spaces Sa to Sd, eventually the plurality of support plate segments 3*a* to 3*d*, on a one-to-one basis.

Two piping materials 73 are provided on the inflow side and the outflow side with respect to each of the divided spaces Sa to Sd or each of the support plate segments 3*a* to 3*d*. A set of two piping materials 73 on the inflow side and the outflow side is provided as many as the divided spaces Sa to Sd, eventually the support plate segments 3*a* to 3*d*. Focusing on each of the divided spaces Sa to Sd, the piping material 73 on the inflow side connects the outflow connection ports 74*a* to 74*d* of the inflow passage 71*a* to the inflow connection ports 34*a* to 34*d* of the support plate segments 3*a* to 3*d*, on one side in the vehicle width direction. The piping material 73 on the outflow side connects the outflow connection ports 35*a* to 35*d* of the support plate segments 3*a* to 3*d* to the inflow connection ports 75*a* to 75*d* of the outflow passage 71*b*, on the other side in the vehicle width direction.

The inflow connection ports 74*a* to 74*d* and the outflow connection ports 75*a* to 75*d* of the in-frame passage 71 are open to the inner side surface of the inner protruding portion 22 and directed inward in the vehicle width direction. On the other hand, the outflow connection ports 34*a* to 34*d* and the inflow connection ports 35*a* to 35*d* of the in-plate passage 72 are open to the lower surfaces of the support plate segments 3*a* to 3*d* and directed downward. The piping material 73 extends inward in the vehicle width direction from each of the side frames 2A and 2B, is bent upward, and is connected to the support plate segments 3*a* to 3*d*. The routing is compact, and the piping material 73 is housed in a space S2 between the lower surface of the support plate 3 and the upper surface of the undercover 5.

The inner protruding portions 22 of the side frames 2A and 2B are portions protruding inward in the vehicle width direction with respect to the base portion 21 having the inner peripheral surface that defines the housing space S or the divided spaces Sa to Sd. The support plate 3 is supported on the inner protruding portion 22. Since being provided inside such an inner protruding portion 22, the in-frame passage 71 is disposed on the inner side in the vehicle width direction of the inner peripheral surface and below the support plate 3.

<Action and Effect>

The battery case 1 according to the present embodiment includes a frame body 2 having a rectangular frame shape in a plan view, and the frame body 2 includes front and rear frames 2F and 2R extending in the vehicle width direction, and a pair of side frames 2A and 2B extending in the vehicle length direction. Each of the front and rear frames 2F and 2R includes a main body portion 11 extending in the vehicle width direction and a pair of extending portions 12 extending in the vehicle width direction from both respective end portions in the vehicle width direction of the main body portion 11, and the pair of extending portions 12 is provided in an outer peripheral portion of each of the front and rear frames 2F and 2R. Each of both end portions of the main body portion 11 has an end surface 11*a* directed in the vehicle width direction, and each of the pair of extending portions 12 has an inner side surface 12*a* directed in the vehicle length direction. At each end portion of the front and rear frames 2F and 2R, the end surface 11*a* of the main body portion 11 and the inner side surface 12*a* of the extending portion 12 are orthogonal to each other. Both respective end portions of each of the pair of side frames 2A and 2B are joined to the front and rear frames 2F and 2R in a state where the end surface thereof is in surface contact with the inner side surface 12*a* of the extending portion 12 and the side surface thereof is in surface contact with the end surface 11*a* of the main body portion 11.

According to the above configuration, when the vehicle receives a collision load from the side, the load is received by the end surface 11*a* and the side surfaces of the front and rear frames 2F and 2R in surface contact with the end surface 11*a* of the main body portion 11. When the vehicle receives a collision load from the front or the rear, the load is received by the inner side surface 12*a* of the extending portion 12 and the end surfaces of the side frames 2A and 2B in surface contact with the inner side surface 12*a*. The shear load acting on the joint portion 2W present in the frame body 2 is significantly reduced. Therefore, the strength of the battery case 1 is improved.

Regarding the front and rear frames 2F and 2R, the main body portion 11 includes a base portion 13 having a rectangular cross section, and an inner protruding portion 14 protruding from a lower end portion of the base portion 13 toward the frame inner peripheral side in the vehicle length direction and extending in the vehicle width direction. On the other hand, each of the pair of side frames 2A and 2B includes a base portion 21 having a rectangular cross section and an inner protruding portion 22 protruding from a lower end portion of the base portion 21 toward the frame inner peripheral side in the vehicle width direction. Accordingly, a collision load from the front or the rear can be absorbed by the rectangular cross section of the base portion 13, and a collision load from the side can be absorbed by the rectangular cross section of the base portion 21. Therefore, the strength of the battery case 1 is improved. Since the front and rear frames 2F and 2R include the inner protruding portions 14, the cross-sectional area of these frames 2F and 2R increases, and the strength is improved. The same applies to the side frames 2A and 2B including the inner protruding portions 22. The base portion 13 has an inner side wall 13*a* and an outer side wall 13*b* facing each other in the vehicle length direction. Each of the pair of extending portions 12 includes a closed cross-sectional portion 14 formed by extending the base portion 13 on the upper side of the inner protruding portion 14 and a plate-shaped portion 15 formed by extending the outer side wall 13*b* on the lower side of the closed cross-sectional portion 14 and the tip side in the vehicle width direction. The inner protruding portion 14 is in surface contact with the side surface of the inner protruding portion 22, the closed cross-sectional portion 15 is in surface contact with the side surface of the base portion 21, and the plate-shaped portion 16 is in surface contact with the end surfaces of the base portion 21 and the inner protruding portion 22. Accordingly, the extending portion 12 is provided on the tip side in the vehicle width direction with respect to the inner protruding portion 14 and on the frame outer peripheral side with respect to the inner protruding portion 14. The extending portion 12 includes a closed cross-sectional portion 15 and a plate-shaped portion 16, and the plate-shaped portion 16 has an L shape on the lower side of the closed cross-sectional portion 15 and on the tip side in the vehicle width direction. Therefore, even if the inner protruding portions 22 are provided on both the front and rear frames 2F and 2R and the pair of side frames 2A and 2B, the inner protruding portions 14 and 22 of both can be joined in a state of surface contact without interference. The closed cross-sectional portion 15 of the extending portion 12 is configured by extending of the base portion 13 having a rectangular cross section, and the plate-shaped portion 16 of the extending portion 12 is configured by extending of the extending portion 12 of the outer side wall 13*b* of the base portion 13. Therefore, the extending portion 12 can be easily molded.

The front and rear frames 2F and 2R may be molded from an extruded material. In this case, the pair of extending portions 12 can be formed by cutting work, and integration of the main body portion 11 and the pair of extending portions 12 can be easily achieved.

The battery case 1 according to the present embodiment includes a frame body 2 having a rectangular frame shape in a plan view, a support plate 3 that is provided in a lower portion of the frame body 2 and supports the battery B, and a refrigerant passage 70 through which a liquid refrigerant for cooling the battery B flows. The inner peripheral surface of the frame body 2 and the upper surface of the support plate 3 define a housing space S for housing the battery B. The frame body 2 includes a pair of side frames 2A and 2B, and each of the pair of side frames 2A and 2B includes a base portion 21 extending in the up-down direction and the vehicle length direction, and an inner protruding portion 22 protruding from a lower end of the base portion 21 toward the frame inner peripheral side. The refrigerant passage 70 includes an in-frame passage 71 formed inside the pair of side frames 2A and 2B, and an in-plate passage 72 communicating with the in-frame passage 71 and formed inside the support plate 3. The support plate 3 is supported on the inner protruding portion 22. The base portion 21 constitutes a part of the inner peripheral surface defining the housing space S. The in-frame passage 71 is provided in the inner protruding portion 22.

According to the above configuration, the support plate 3 defines the housing space S of the battery B and supports the battery B, and the refrigerant passage 70 includes the in-plate passage 72 in the support plate 3. The refrigerant flowing through the in-plate passage 72 can exchange heat with the battery B by solid heat transfer through the support plate 3, and the cooling performance of the battery B is improved. The in-plate passage 72 communicates with an in-frame passage 71 formed inside the frame body 2. Accordingly, the refrigerant can flow from the in-frame passage 71 to the in-plate passage 72 or vice versa, and the cooling performance can be improved by supplying and discharging the refrigerant to and from the support plate 3.

The in-frame passage 71 is provided in the inner protruding portion 22. Therefore, the in-frame passage 71 is disposed on the inner side in the vehicle width direction of the inner peripheral surface (in particular, the inner peripheral surface constituted by the base portion 21) of the frame body 2 and below the support plate 3. Accordingly, when a collision load acts on the vehicle from the side, the base portions 21 of the side frames 2A and 2B receive the load from the side. The base portion 21 may be deformed so as to be bent toward the frame inner peripheral side, but the inner protruding portion 22 is provided at the lower end of the base portion 21 and protrudes toward the frame inner peripheral side, and thus is less likely to be affected by a load. Therefore, the in-frame passage 71 is less likely to be broken by the load, and the cooling mechanism 7 is protected. Even if the in-frame passage 71 is broken, since the in-frame passage 71 is positioned below the support plate 3, the refrigerant leaking from the in-frame passage 71 is less likely to enter the housing space S. Therefore, the liquid-proof performance of the battery B is also high. In particular, in the present embodiment, since the sealability of the housing space S is improved by providing a sealant between the support plate 3 and the inner protruding portion 22, it is easier to prevent the refrigerant from entering the housing space S.

Each of the pair of side frames 2A and 2B includes an outer protruding portion 23 protruding to the lower end of the base portion 21 or the outside in the vehicle width direction, the vehicle body frame is attached to the upper surface of the outer protruding portion 23, and the upper surface of the inner protruding portion 22 is positioned below the upper surface of the outer protruding portion 23. Accordingly, when a collision load from the side is input to the vehicle, the load acts on a portion above the upper surface of the outer protruding portion 23 in the battery case 1 through the vehicle body frame. When the upper surface of the inner protruding portion 22 is positioned below the upper surface of the outer protruding portion 23, the load input to the in-frame passage 71 can be significantly reduced, so that the protection performance of the cooling mechanism 7 is improved.

Each of the pair of side frames 2A and 2B is made of an extruded material, and the in-frame passage 71 is formed of a hollow portion molded at the time of extrusion and is integrated with each of the pair of side frames 2A and 2B. Accordingly, a long in-frame passage 71 can be easily achieved along the longitudinal direction of the side frames 2A and 2B.

The battery case 1 further includes an undercover 5 to be attached to the lower surface of the inner protruding portion 22. The refrigerant passage 70 includes a piping material 73 that connects the in-frame passage 71 and the in-plate passage 72. The piping material 73 is housed in a space S2 between the support plate 3 and the undercover 5. The piping material 73 is disposed in a space S2 isolated from the housing space S of the battery B by the support plate 3 and isolated from the lower outside of the case by the undercover 5. It is possible to prevent the piping material 73 from being contaminated with sand gravel or water swirled up from the road surface while the vehicle is traveling, and it is possible to protect the battery B from the refrigerant even if the refrigerant leaks from the piping material 73 due to the influence of collision or the like.

Outflow connection ports 74*a* to 74*d* of the in-frame passage 71 are directed in the vehicle width direction. Accordingly, when the piping material 73 is routed in the space S2 between the support plate 3 and the undercover 5, the piping material 73 becomes compact. In addition, when the in-frame passage 71 is broken, the refrigerant is less likely to go to the housing space S above, and the battery B can be protected from the refrigerant.

The extending portion 12 is provided with an inlet 70*a* or an outlet 70*b* of the refrigerant passage 70, and the in-frame passage 71 of the refrigerant passage 70 communicates with the inlet 70*a* and the outlet 70*b*. In a form in which the end surface of the inner protruding portion 22 is in surface contact with the extending portion 12, the long in-frame passage 71 along the extending direction of the side frames 2A and 2B can communicate with the outside of the frame body 2 simply by opening a through hole in the extending portion 12. It is possible to simplify the configuration of the cooling mechanism 7 while securing the strength of the battery case 1.

The battery case 1 according to the present embodiment includes one or more cross members 4 provided inside the frame body 2, a support plate 3 provided in a lower portion of the frame body 2 and supporting the battery B, and an undercover 5 covering the frame body 2 and the support plate 3 from below. The one or more cross members 4 extend in the vehicle width direction inside the frame body 2 and connect the pair of side frames 2A and 2B to each other. The cross member 4 includes a partition wall portion 41 and a pair of protruding portions 52. The partition wall portion 51 extends in the vehicle width direction and the up-down direction. The pair of protruding portions 42 protrudes from the lower end portion of the partition wall portion 41 to both sides in the vehicle length direction more than both side surfaces of the partition wall portion 41 and extends in the vehicle width direction. Both end portions in the vehicle width direction of the partition wall portion 451 and the pair of protruding portions 42 are connected to the respective inner side surfaces of the pair of side frames 2A and 2B. The support plate 3 is supported on the upper surface of the protruding portion 42, and the undercover 5 is attached to the lower surface of the cross member 4.

According to the above configuration, the battery B is housed in the housing space S defined by the upper surface of the support plate 3 and the inner peripheral surface of the frame body 2, and the partition wall portion 41 partitions the housing space S in the vehicle length direction. The cross member 4 includes a pair of protruding portions 42 positioned below the support plate 3 and eventually below the housing space S, and the pair of protruding portions 42 is also connected to the respective inner side surfaces of the pair of side frames 2A and 2B. Therefore, when a collision load acts on the vehicle from the side, the load can also be transferred to the pair of protruding portions 42. Accordingly, it is allowed to reduce the width (dimension in the vehicle length direction) of the partition wall portion 41 without reducing the strength of the battery case 1, and the reduction in the housing space S by the partition wall portion 41 is reduced. As described above, both securing the strength of the battery case 1 and improving the load efficiency of the battery B can be achieved.

The cross member 4 is made of an extruded material, and the partition wall portion 41 and the pair of protruding portions 42 are integrally molded. Accordingly, the cross member 4 including the partition wall portion 41 and the pair of protruding portions 42 can be easily achieved. The cross member 5 is made of a 7000 series aluminum alloy. Since the 7000 series is a material having high strength, the strength of the battery case 1 is improved. In the present embodiment, the waterproofness of the space in which the cross member 4 is disposed is enhanced, and thus, it is possible to suppress the occurrence of stress corrosion cracking (SCC) of the cross member 4 even when the 7000 series is used.

Second Embodiment

Figure 14:
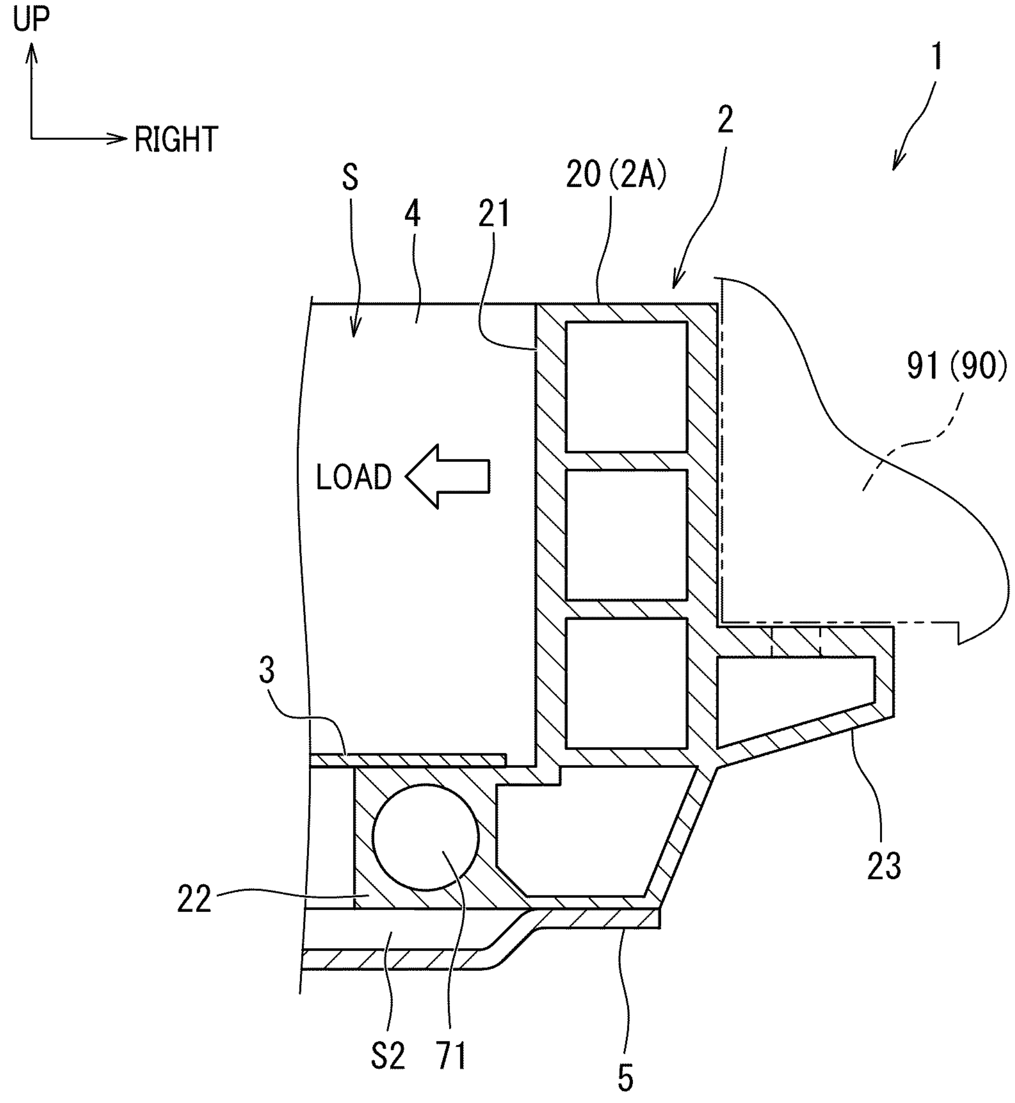
FIG. 14 is a cross-sectional view of a battery case for a vehicle according to a second embodiment.

Next, a second embodiment will be described with reference to FIG. 14, focusing on the difference from the above embodiment.

In the present embodiment, the lower surface of the outer protruding portion 23 is also positioned above the upper surface of the inner protruding portion 22, and the entire outer protruding portion 23 is positioned above the inner protruding portion 22. The upper surface of the inner protruding portion 22 and the upper surface of the outer protruding portion 23 are separated from each other in the up-down direction by a distance equal to or more than the height of the outer protruding portion 23. Accordingly, the load from the side is further less likely to act on the in-frame passage 71, and the protection performance of the cooling mechanism 7 is further improved.

Third Embodiment

Next, with reference to FIGS. 15A and 15B, a third embodiment and modifications thereof will be described focusing on differences from the above embodiments.

Figure 15A:
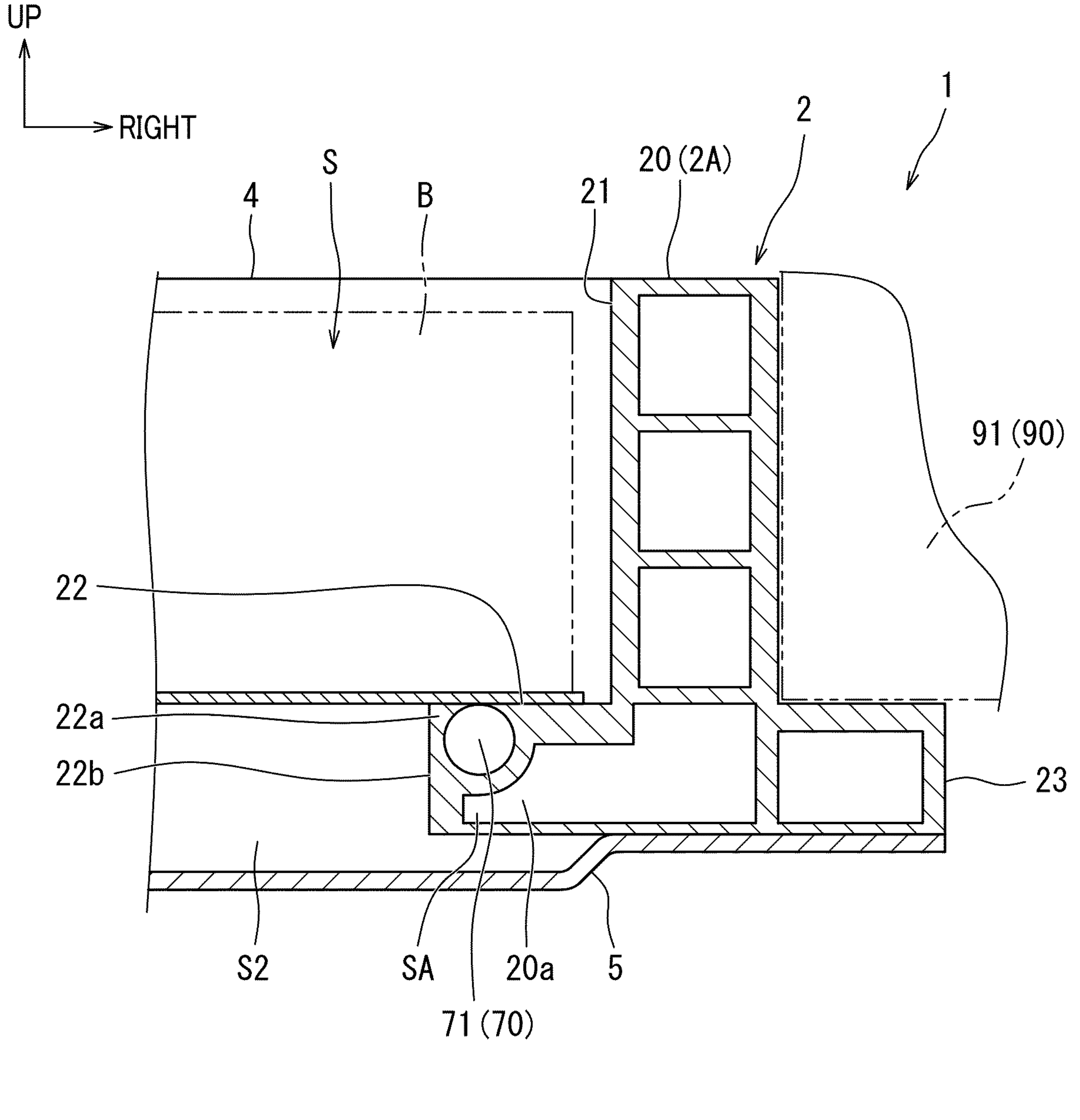
FIG. 15A is a cross-sectional view of a battery case for a vehicle according to a third embodiment.

Referring to FIG. 15A, in the third embodiment, the space formed inside the lower portion of the base portion 21 includes an enlarged portion 20*a* enlarged inside the inner protruding portion 22. Accordingly, inside the inner protruding portion 22, the enlarged portion 20*a* is positioned below the in-frame passage 71. In the enlarged portion 20*a*, no special liquid such as a refrigerant, or gas flows and air is present. On the other hand, the in-frame passage 71 is adjacent to the support plate 3 or the housing space S, with interposition of the upper wall 22*a* of the inner protruding portion 22 above the in-frame passage 71.

The in-frame passage 71 is adjacent to the housing space S with interposition of the relatively thin upper wall 22*a*, but is adjacent to the space S2 below the inner protruding portion 22 with interposition of the air layer SA in the enlarged portion 20*a* and the lower wall 22*b* of the inner protruding portion 22. Then, the in-frame passage 71 is adjacent to the space outside the case below the undercover 5 with interposition of the space S2 and the undercover 5. No solid heat transfer occurs in the air layer SA. Therefore, the in-frame passage 71 is thermally insulated from the space S2 below, heat exchange between the refrigerant, and the battery B in the housing space S, is efficiently performed, and cooling performance of the battery B is improved.

Figure 15B:
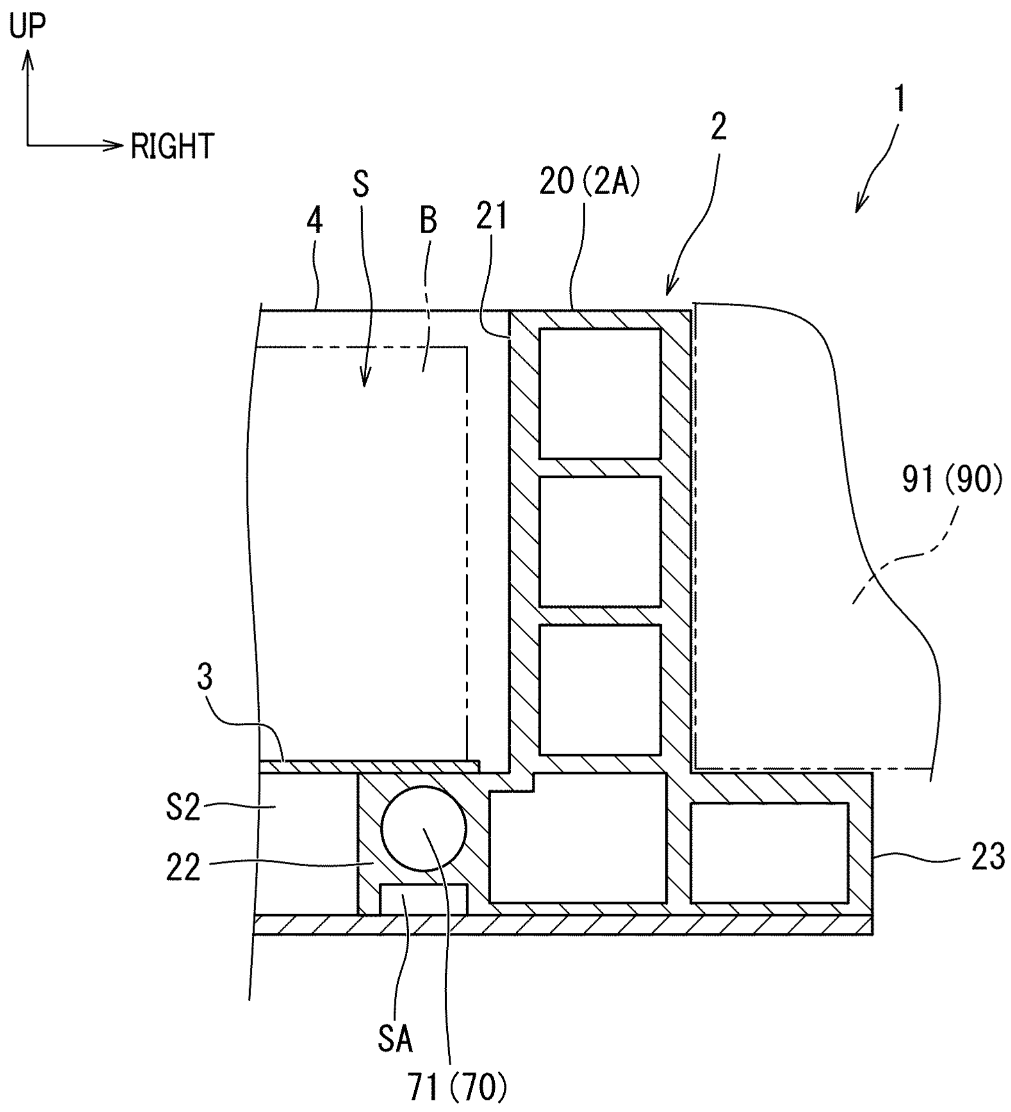
FIG. 15B is a cross-sectional view of a battery case for a vehicle according to a modification of the third embodiment.

FIG. 15B shows a modification of the form in which the air layer is provided. The lower surface of the inner protruding portion 22 may be recessed upward. When the undercover 5 is fixed to the side frames 2A and 2B in a state of being in contact with the lower surface of the inner protruding portion 22, an air layer SA is formed between the in-frame passage 71 and the undercover 5. Accordingly, as in the above form, heat exchange between the refrigerant, and the battery B in the housing space S, is efficiently performed, and cooling performance of the battery B is improved.

Fourth Embodiment

Figure 16:
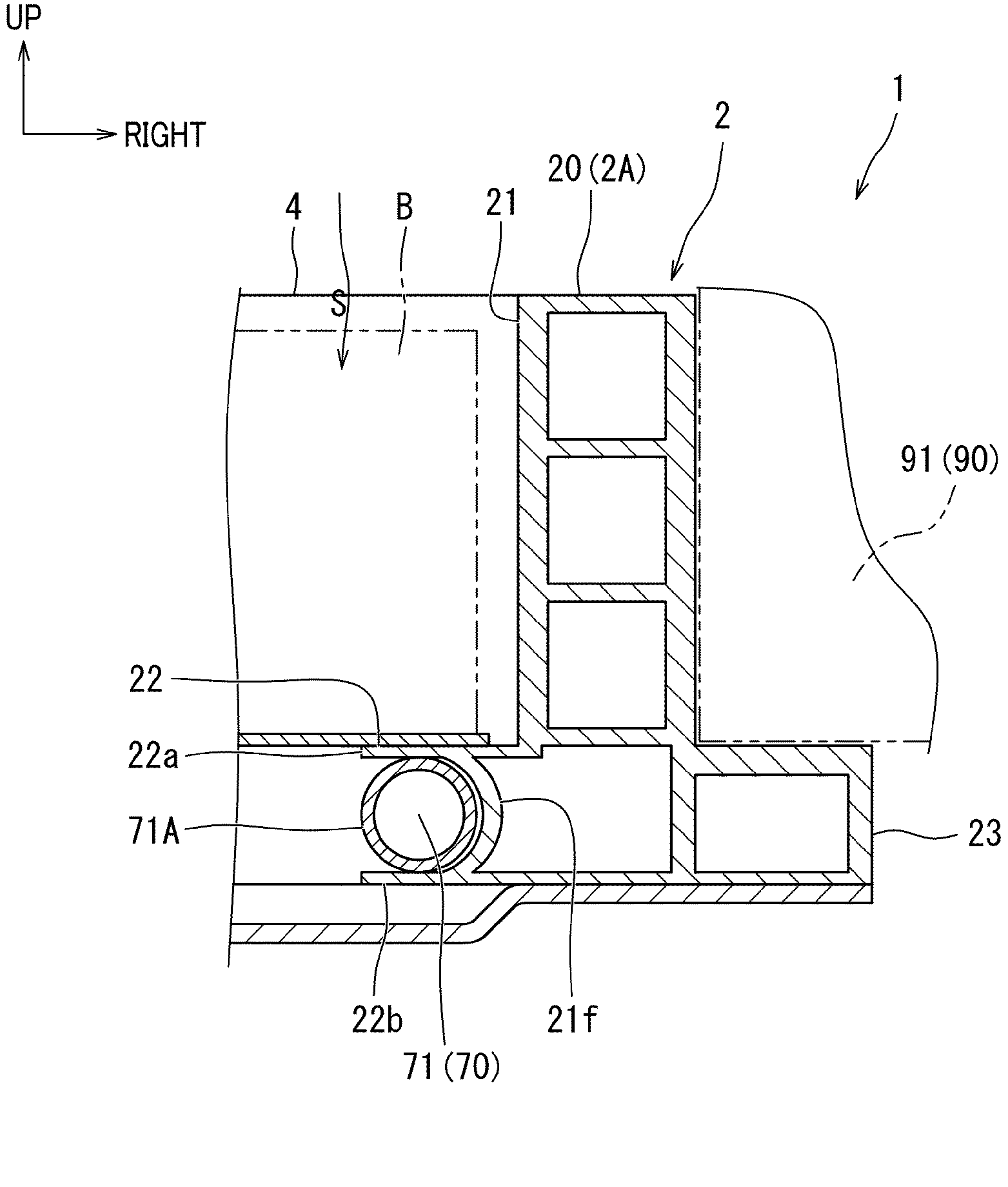
FIG. 16 is a cross-sectional view of a battery case for a vehicle according to a fourth embodiment.

Next, a fourth embodiment will be described with reference to FIG. 16, focusing on the differences from the above embodiments.

In the present embodiment, the in-frame passage 71 is not formed integrally with the side frames 2A and 2B, but is formed of a pipe 71A separate from the side frames 2A and 2B. The inner protruding portion 22 is integrated with the base portion 21 by extrusion molding. The inner protruding portion 22 includes an upper wall 22*a* and a lower wall 22*b* protruding inward in the vehicle width direction from the base portion 21, but does not include a side wall on an inner side in the vehicle width direction. A space surrounded by the upper wall 22*a* and the lower wall 22*b* is opened inward in the vehicle width direction. The pipe 71A has a circular cross section, and is fitted into a space surrounded by the upper wall 22*a* and the lower wall 22*b* through an opening from the outer side to the inner side in the vehicle width direction.

The cross-sectional shape of the pipe 71A is not particularly limited, but is, for example, a circular shape. In this case, the partition wall portion 21*f* that partitions the inner protruding portion 22 and the base portion 21 may be curved in an arc shape. Accordingly, the outer peripheral surface of the pipe 71A is engaged with the partition wall portion 21*f*, and the pipe 71A is less likely to fall off from the inner protruding portion 22.

As described above, when the in-frame passage 71 is formed of the pipe 71A, the pipe 71A is protected by the frame body 2, and the protection performance of the cooling mechanism 7 is improved. In addition, since the in-frame passage 71 communicates with a plurality of in-plate passages 72, it is necessary to provide a plurality of branch portions. When the in-frame passage 71 is formed of the pipe 71A, this branch portion can be easily set. As described above, when the refrigerant passage 70 includes a plurality of in-plate passages 72 connected in parallel to the in-frame passages 71, it is advantageous in that the cooling mechanism 7 can be easily configured.

MODIFICATION

Although the embodiments have been described so far, the above configuration can be appropriately added, changed, or deleted within the scope of the gist of the present invention.

The inner protruding portion 22 may be separate from the base portion 21. In that case, the components constituting the inner protruding portion 22 are joined to the components constituting the base portion 21 by welding or other joining means. As an example, the inner protruding portion 22 is made of an extruded material molded of the same type of metal (aluminum-based alloy) as that of the base portion 21, and is formed in a hollow shape. This hollow portion can form the in-frame passage 71.

What is claimed is:

1. A battery case for a vehicle comprising:
- a frame body having a rectangular frame shape in a plan view;
- a support plate provided in a lower portion of the frame body, the support plate being configured to support a battery; and
- a refrigerant passage through which a liquid refrigerant for cooling the battery flows,
- wherein an inner peripheral surface of the frame body and an upper surface of the support plate define a housing space for housing the battery,
- wherein the frame body includes a pair of side frames extending in a vehicle length direction,
- wherein each of the pair of side frames includes:
- a base portion extending in an up-down direction and the vehicle length direction and constituting the inner peripheral surface; and
- an inner protruding portion protruding inward in a vehicle width direction from a lower end of the base portion and extending in the vehicle length direction,
- wherein the refrigerant passage includes an in-frame passage formed inside the pair of side frames and an in-plate passage communicating with the in-frame passage and formed inside the support plate, and wherein the support plate is supported on the inner protruding portion, and the in-frame passage is provided in the inner protruding portion, and is disposed on the inner side in the vehicle width direction with respect to the inner peripheral surface and below the support plate.

2. The battery case for the vehicle according to claim 1, wherein each of the pair of side frames includes an outer protruding portion that protrudes outward in the vehicle width direction from the lower end of the base portion, extends in the vehicle length direction, and has a vehicle body frame attached thereto, and wherein an upper surface of the inner protruding portion is positioned below an upper surface of the outer protruding portion.

3. The battery case for the vehicle according to claim 2, wherein each of the pair of side frames is made of an extruded material, and wherein the in-frame passage is formed of a hollow portion molded at a time of extrusion and is integrated with each of the pair of side frames.

4. The battery case for the vehicle according to claim 1, wherein an air layer is formed below the in-frame passage.

5. The battery case for the vehicle according to claim 4, wherein each of the pair of side frames is made of an extruded material, and wherein the in-frame passage is formed of a hollow portion molded at a time of extrusion and is integrated with each of the pair of side frames.

6. The battery case for the vehicle according to claim 1, wherein each of the pair of side frames is made of an extruded material, and wherein the in-frame passage is formed of a hollow portion molded at a time of extrusion and is integrated with each of the pair of side frames.

7. The battery case for the vehicle according to claim 1, further comprising an undercover to be attached to a lower surface of the inner protruding portion, wherein the refrigerant passage includes a piping material connecting the in-frame passage and the in-plate passage, and the piping material is housed in a space between the support plate and the undercover.

8. The battery case for the vehicle according to claim 4, wherein each of the pair of side frames is made of an extruded material, and wherein the in-frame passage is formed of a hollow portion molded at a time of extrusion and is integrated with each of the pair of side frames.

9. The battery case for the vehicle according to claim 4, wherein a connection port of the in-frame passage with the piping material is directed in the vehicle width direction.

10. The battery case for the vehicle according to claim 9, wherein each of the pair of side frames is made of an extruded material, and wherein the in-frame passage is formed of a hollow portion molded at a time of extrusion and is integrated with each of the pair of side frames.

* * * * *